United States Patent
Nakao et al.

(10) Patent No.: US 8,149,237 B2
(45) Date of Patent: Apr. 3, 2012

(54) INFORMATION PROCESSING APPARATUS AND PROGRAM

(75) Inventors: Megumi Nakao, Nara (JP); Tomohiro Kuroda, Kyoto (JP)

(73) Assignee: National University Corporation Nara Institute of Science and Technology, Nara (JP)

( * ) Notice: Subject to any disclaimer, the term of this patent is extended or adjusted under 35 U.S.C. 154(b) by 213 days.

(21) Appl. No.: 11/659,088

(22) PCT Filed: Aug. 1, 2005

(86) PCT No.: PCT/JP2005/014024
§ 371 (c)(1),
(2), (4) Date: Nov. 4, 2008

(87) PCT Pub. No.: WO2006/013813
PCT Pub. Date: Feb. 9, 2006

(65) Prior Publication Data
US 2009/0079736 A1    Mar. 26, 2009

(30) Foreign Application Priority Data
Aug. 2, 2004   (JP) .................................. 2004-225388

(51) Int. Cl.
*G06T 15/00*    (2011.01)
(52) U.S. Cl. ........ 345/424; 345/419; 345/420; 345/428; 700/98; 700/182; 703/8; 715/964
(58) Field of Classification Search .................. 345/419, 345/420, 424, 428; 700/98, 182; 703/8; 715/964
See application file for complete search history.

(56) References Cited

U.S. PATENT DOCUMENTS

| 6,069,634 | A | * | 5/2000 | Gibson | .................... 345/424 |
| 6,498,607 | B1 | | 12/2002 | Pfister et al. | |
| 7,079,996 | B2 | * | 7/2006 | Stewart et al. | .................... 703/8 |
| 7,167,172 | B2 | | 1/2007 | Kaus et al. | |
| 7,505,037 | B2 | * | 3/2009 | Wang | .................... 345/424 |

(Continued)

FOREIGN PATENT DOCUMENTS

JP    2000-222601 A    8/2000
(Continued)

OTHER PUBLICATIONS

Mueller et al., Volumetric Meshes for Real-Time Medical Simulations, Bildverarbeitung fur die Medizin 2003, pp. 279-283.*

(Continued)

*Primary Examiner* — Phu Nguyen
(74) *Attorney, Agent, or Firm* — Rader, Fishman & Grauer PLLC

(57) ABSTRACT

An information processing apparatus according to the present invention deforms stored first mesh information of a three-dimensional object based on a deformation instruction for instructing deformation of the three-dimensional object, to acquire second mesh information, acquires a first slice information group, which is a plurality of slice information, based on the second mesh information, determines color information of the points after deformation from stored 3D voxel information, sets new color information for the points of the first slice information group based on the determined color information of the points to acquire a second slice information group, and displays that second slice information group. With this information processing apparatus, it is possible to render deformation in the shape of a three-dimensional object in real time, along with the color information of its surface and interior.

24 Claims, 21 Drawing Sheets

U.S. PATENT DOCUMENTS 7,515,954 B2 * 4/2009 Harlev et al. ............... 600/509
7,633,503 B2 * 12/2009 Snyder et al. ............... 345/426

FOREIGN PATENT DOCUMENTS

| | | |
|---|---|---|
| JP | 2002-329216 A | 11/2002 |
| JP | 2003-044869 A | 2/2003 |
| JP | 2003-180654 A | 7/2003 |
| JP | 2004-133550 A | 4/2004 |
| WO | WO-2004/075112 A1 | 9/2004 |

OTHER PUBLICATIONS

Zhang et al., Adaptive and Quality 3D Meshing from Image Data, ACM Symposium on Solid and Physical Modeling, 2003, pp. 286-291.*

Masuda et al., Interactive Deformation of 3D Mesh Models, Computer-Aided Design and Applications, 2008, pp. 1-11.*

Zhou et al., Large Mesh Deformation Using the Volumetric Graph Laplacian, ACM Transaction on Graphics, 24(3), 2005, pp. 496-503.*

I. Fujishiro et al., "Parallel Visualization of Gigabyte Datasets in GeoFEM," Concurrency and Computation: Practice and Experience, vol. 14, No. 6-7, pp. 521-530 (2002).

B. Wünsche, "The Visualization and Measurement of Left Ventricular Deformation," Proc. The First Asia-Pacific bioinformatics conference on Bioinformatics, pp. 119-128 (2003).

B. Pflesser et al., "Volume Based Planning and Rehearsal of Surgical Interventions," Proc. Computer Assisted Radiology and Surgery (CARS), pp. 607-612 (2000).

R. A. Drebin et al., "Volume Rendering," Computer Graphics (Proc. ACM SIGGRAPH), vol. 22, No. 4, pp. 65-76, (Aug. 1988).

F. Dachille et al., "High-quality Volume rendering Using Texture Mapping Hardware", Proc. The ACM SIGGRAPH/EUROGRAPHICS workshop on Graphics hardware, p. 69, (1998).

M. Weiler et al., "Hardware-Based Ray Casting for Tetrahedral Meshes," Proc. 14$^{th}$ IEEE Visualization Conference, pp. 333-340, (2003).

M. Weiler et al., "Hardware-Based View-Independent Cell Projection," Proc. IEEE Volume Visualization and Graphics, pp. 13-22 (2002).

Wang et al., "Volume Sampled Voxelization of Geometric Primitives," Proc. IEEE Symposium on Volume Visualization and Graphics, pp. 13-22, (2002).

J. Huang et al., "An Accurate Method for Voxelizing Polygon Meshes," ACM Symposium on Volume Visualization, pp. 119-126 (1998).

K. Kajihara et al., "A method of rendering scenes including volumetric objects using ray-volume buffers", vol. 25, No. 85, p. 20, (Dec. 2001).

Y. Inoue et al., "Development of Surgical Simulator with High Quality Visualization Based on Finite Element Method, and Deformable Volume Rendering", Denshi Jyohou Tsuushin Gakkai Ronbunshi, D11, vol. J87-D-11, No. 1, pp. 272-280, Japan (Jan. 2004).

K. Kajihara et al., "A Method of Rendering Scenes including Volumetric Objects using Ray-Volume Buffers", ITE Technical Report, vol. 25, No. 85, pp. 19-24, Japan (Dec. 14, 2001).

Westermann, R., et al., "Real-Time Volume Deformations", Computer Graphics Forum Blackwell Publishers for Eurographics Assoc. UK, vol. 20, No. 3, 2001, pp. C/443-C/451, 554.

Nedunuri, S., et al., "Displaying Random Surfaces", The Computer Journal, vol. 30, No. 2, 1987, 163-167.

* cited by examiner

FIG.5

| point identifier | position information |
|---|---|
| A | ($x_1$, $y_1$, $z_1$) |
| B | ($x_2$, $y_2$, $z_2$) |
| C | ($x_3$, $y_3$, $z_3$) |
| O | ($x_4$, $y_4$, $z_4$) |
| ⋮ | ⋮ |

FIG.6

$(x_1, y_1, z_1, col_1), (x_2, y_2, z_2, col_2),$ ............

...................................................................................,

...................................................................................,

...................................................................................,

............................................., $(x_n, y_n, z_n, col_n)$

FIG.7

| point identifier | position information |
|---|---|
| A' | ( $x'_1$, $y'_1$, $z'_1$ ) |
| B' | ( $x'_2$, $y'_2$, $z'_2$ ) |
| C' | ( $x'_3$, $y'_3$, $z'_3$ ) |
| O' | ( $x'_4$, $y'_4$, $z'_4$ ) |
| ⋮ | ⋮ |

ID_PROCESSING APPARATUS
AND PROGRAM

TECHNICAL FIELD

The present invention relates to an information processing apparatus that displays three-dimensional objects, and a program and the like for the same.

BACKGROUND ART

Recently, various mechanical and physiological simulations are being performed by CAD (Computer Aided Design), biological function analysis, surgery training systems and the like in mechanical engineering, fields related to materials and substances, and fields of medicine and medical services (see Non-patent Document 1, Non-patent Document 2 and Non-patent Document 3). On such occasions, the data mainly used for the simulations is large-scale three-dimensional data, and a variety of visualization approaches, including volume rendering (see Non-patent Document 4 and Non-patent Document 5), are used for visualizing analysis results.

In the case of analyzing the mechanical characteristics of a mechanical part, an elastic material, a human organ or the like, a three-dimensional mesh is prepared from a set of tomograms obtained by CT, MRI or the like after performing region extraction, surface generation and the like as pre-processing. Displacement of the constructed mesh is obtained using a mechanical calculation solver, and the analysis result is visualized by surface polygon rendering or cell-projection (see Non-patent Document 6 and Non-patent Document 7).

There is also an approach that carries out voxelization once again from the mesh form after a simulation and performs volume rendering (see Non-patent Document 8 and Non-patent Document 9). During the voxelization, volume texture after deformation is newly created each time, while referring to the voxel grey value of the original image.

Non-patent Document 1 I. Fujishiro, L. Chen, Y. Takeshima, H. Nakamura and Y. Suzuki, "Parallel Visuzalization of Gigabyte Datasets in GeoFEM", Concurrency and Computation: Practice and Experience, Vol. 14, No. 6-7, pp. 521-530, 2002

Non-patent Document 2 B. Wunsche, "The Visualization and Measurement of Left Ventricular Deformation", Proc. the First Asia-Pacific bioinformatics conference on Bioinformatics, pp. 119-128, 2003.

Non-patent Document 3 B. Pflesser, U. Tiede, K. H. Hohne and R. R. Leuwer, "Volume Based Planning and Rehearsal of Surgical Intervention", Proc. Computer Assisted Radiology and Surgery (CARS), pp. 607-612, 2000

Non-patent Document 4 R. A. Drebin, L. Carpenter and P. Hanrahan, "Volume Rendering", Computer Graphics (Proc. ACM SIGGRAPH), Vol. 22, No. 4, pp. 65-74, 1988.

Non-patent Document 5 F. Dachille, K. Kreeger, B. Chen, I. Bitter and A. Kaufman, "High-quality Volume Rendering Using Texture Mapping Hardware", Proc. The ACM SIGGRAPH/EUROGRAPHICS workshop on Graphics hardware, p. 69, 1998.

Non-patent Document 6 M. Weiler, M. Kraus, M. Merz and T. Ertl, "Hardware-Based Ray Casting for Tetrahedral Meshes", Proc. IEEE Visualization, pp. 333-340, 2003.

Non-patent Document 7 M. Weiler, M. Kraus and T. Ertl, "Hardware-Based View-Independent Cell Projection", Proc. the IEEE Symposium on Volume Visualization and Graphics, pp. 13-22, 2002.

Non-patent Document 8 A. E. Kaufman, S. W. Wang, "Volume Sampled Voxelization of Geometric Primitives", Proc. IEEE Visualization, pp. 78-84, 1993.

Non-patent Document 9 J. Huang, R. Yagel, V. Filippov and Y. Kurzion "An Accurate Method for Voxelizing Polygon Meshes", ACM Symposium on Volume Visualization, pp. 119-126, 1998.

DISCLOSURE OF THE INVENTION

Problem to be Solved by the Invention

However, although the advanced simulators of Non-patent Document 1 through Non-patent Document 5 are required to render analysis results on a model having a three-dimensional shape, including its surface and internal structures, with high precision at high speed, they have not met these requirements. Examples thereof include visualization of a change in the internal structure of a structure when deformation or destruction is applied thereto, and rendering of a change in the lumen of an organ model, such as a beating heart, during exclusion, grasping, or the like. In particular, it is essential for interactive VR simulators, including an operation simulator, to present analysis results in the form of smooth animation in real time.

With the approaches of Non-patent Document 6 and Non-patent Document 7, it is difficult to keep up the level of detail of voxel data made up of not less than ten-million elements during mesh generation, so that a large portion of the grey value information of the original image will be omitted. Accordingly, although it is possible to render changes in the shape, it is not possible to reflect the color information or the grey value in a deformation result.

With the methods of Non-patent Document 8 and Non-patent Document 9, the color information after deformation may be reproduced, but voxelization on a CPU requires time and thus is difficult to be achieved in real time with a general-purpose PC. Furthermore, it will be necessary to transfer large-scale volume texture that has been updated frame by frame to a graphic card, resulting in a great bottleneck for real-time processing.

A first aspect of the present invention is directed to an information processing apparatus including: an object information storage portion that contains first mesh information, which is information of a three-dimensional mesh of a three-dimensional object, and 3D voxel information, which is a volume texture of the three-dimensional object; an instruction receiving portion that receives a deformation instruction for instructing deformation of the three-dimensional object; a second mesh information acquisition portion that deforms the first mesh information based on the deformation instruction to acquire second mesh information that constitutes the deformed shape; a first slice information group acquisition portion that acquires a first slice information group, which is a plurality of slice information including no color information, based on the second mesh information; a color information determination portion that determines color information of points of the plurality of slice information constituting the first slice information group, the points respectively corresponding to points of the 3D voxel information; a second slice information group acquisition portion that sets new color information for the points of the first slice information group acquired by the first slice information group acquisition portion, based on the color information of the points that was determined by the color information determination portion, to acquire a second slice information group; and a deformed object output portion that outputs the second slice information group.

With this configuration, it is possible to render a change in the shape of a three-dimensional object in real time, along with the color information of its surface and interior.

A second aspect of the present invention is directed to an information processing apparatus including: an object information storage portion that contains first mesh information, which is information of a three-dimensional mesh of a three-dimensional object, and 3D voxel information, which is a volume texture of the three-dimensional object; an instruction receiving portion that receives a deformation instruction for instructing deformation of the three-dimensional object; a first slice information group acquisition portion that acquires, in the case where the instruction receiving portion receives the deformation instruction, a first slice information group, which is a plurality of slice information, based on the 3D voxel information; a second mesh information acquisition portion that deforms the first mesh information based on the deformation instruction to acquire second mesh information that constitutes the deformed shape; a second slice information group acquisition portion that deforms the plurality of slice information based on the second mesh information to acquire a second slice information group, which is a plurality of new slice information; a color information determination portion that acquires color information of points in the plurality of slice information constituting the first slice information group, the points respectively corresponding to points of the plurality of new slice information constituting the second slice information group, and determines color information of the points of the plurality of new slice information constituting the second slice information group based on the acquired color information of the points; a third slice information group acquisition portion that sets new color information for the points of the second slice information group acquired by the second slice information group acquisition portion, based on the color information of the points that was determined by the color information determination portion, to acquire a third slice information group; and a deformed object output portion that outputs the third slice information group.

With this configuration, it is possible to render a change in the shape of a three-dimensional object in real time, along with the color information of its surface and interior.

A third aspect of the present invention is directed to an information processing apparatus including: an object information storage portion that contains first mesh information, which is information of a three-dimensional mesh of a three-dimensional object, and a first slice information group, which is a plurality of slice information obtained by slicing a volume texture of the three-dimensional object; an instruction receiving portion that receives a deformation instruction for instructing deformation of the three-dimensional object; a second mesh information acquisition portion that deforms the first mesh information based on the deformation instruction to acquire second mesh information that constitutes the deformed shape; a second slice information group acquisition portion that deforms the plurality of slice information based on the second mesh information to acquire a second slice information group, which is a plurality of new slice information; a color information determination portion that acquires color information of points in the plurality of slice information constituting the first slice information group, the points respectively corresponding to points of the plurality of new slice information constituting the second slice information group, and determines color information of the points of the plurality of new slice information constituting the second slice information group based on the acquired color information of the points; a third slice information group acquisition portion that sets new color information for the points of the second slice information group acquired by the second slice information group acquisition portion, based on the color information of the points that was determined by the color information determination portion, to acquire a third slice information group; and a deformed object output portion that outputs the third slice information group.

With this configuration, it is possible to render a change in the shape of a three-dimensional object in real time, along with the color information of its surface and interior, and to reduce the amount of data to be held in advance.

A fourth aspect of the present invention is directed to the information processing apparatus according to the first or the second aspect, wherein the instruction receiving portion receives input of the deformation instruction and a line-of-sight vector, which is information indicating a direction of a line of sight, and the first slice information group acquisition portion acquires, in the case where the instruction receiving portion receives the deformation instruction, a first slice information group, which is a plurality of slice information perpendicular to the line-of-sight vector, based on the 3D voxel information.

With this configuration, it is possible to realize a high-quality display of a three-dimensional object from the direction indicated by a line-of-sight vector.

A fifth aspect of the present invention is directed to the above-described information processing apparatus, wherein spacing between the plurality of slice information constituting the first slice information group is constant.

With this configuration, it is possible to display a change in the shape of a three-dimensional object at high speed with high quality.

A sixth aspect of the present invention is directed to the above-described information processing apparatus, wherein the deformed object output portion outputs a plurality of slices constituting the third slice information group in decreasing order of depth on a display.

With this configuration, it is possible to display a change in the shape of a three-dimensional object with high quality.

Effect of the Invention

The present invention can provide an information processing apparatus capable of performing processes such as deformation of a three-dimensional object in real time.

BEST MODE FOR CARRYING OUT THE INVENTION

Embodiments of the information processing apparatus and the like according to the present invention are described below with reference to the accompanying drawings. It should be noted that structural components that are denoted by the same reference numerals in the embodiments perform the same operation, and therefore may not be described in duplicate.

Embodiment 1

FIG. 1 is a block diagram showing an information processing apparatus according to this embodiment. The information processing apparatus includes an object information storage portion 101, an instruction receiving portion 102, a second mesh information acquisition portion 103, a first slice information group acquisition portion 104, a color information determination portion 105, a second slice information group acquisition portion 106, and a deformed object output portion 107. The color information determination portion 105 includes a corresponding point determining unit 1051, and a color information determining unit 1052.

The object information storage portion 101 contains first mesh information, which is information of a three-dimensional mesh of a three-dimensional object, and 3D voxel information, which is a volume texture of the three-dimensional object. The three-dimensional mesh information is a set of information of points constituting a three-dimensional object. The three-dimensional mesh information is a set of information of points having spacings therebetween. The information of points is ordinarily the coordinate information (x, y, z). The 3D voxel information is point information constituted by (x, y, z, col), for example. The (x, y, z) of the (x, y, z, col) is coordinate information. "col" is color information. The 3D voxel information may be information of points that are packed densely without any spacing therebetween, or may be information of discrete points. For example, the 3D voxel information may be a group of images obtained by a medical device such as a CT, MRI or PET device. The object information storage portion 101 may be preferably a nonvolatile recording medium, but also may be implemented with a volatile recording medium.

The instruction receiving portion 102 receives input of a deformation instruction for instructing deformation of a three-dimensional object, and a line-of-sight vector, which is information indicating the direction of a line of sight. The deformation instruction and the line-of-sight vector may be input in any manner. The deformation instruction and the line-of-sight vector may be input through different input units. The deformation instruction and the line-of-sight vector may be input through any input unit such as a numeric keypad, keyboard, mouse (including a 3D mouse) and menu screen, or may be input through a line-of-sight input device or the like. The instruction receiving portion 102 may be implemented, for example, with a device driver for an input unit such as a numeric keypad or a keyboard, or control software for a menu screen.

The second mesh information acquisition portion 103 deforms the first mesh information stored in the object information storage portion 101, based on the deformation instruction to acquire second mesh information that constitutes the deformed shape. For example, when a predetermined point of the first mesh information is indicated with a mouse and stretched by dragging, the second mesh information acquisition portion 103 deforms the first mesh information in the stretched direction by the stretched distance of that predetermined point, to acquire second mesh information. The data structure of the second mesh information is ordinarily the same as that of the first mesh information. Ordinarily, the second mesh information acquisition portion 103 may be implemented with a microprocessor unit (MPU), a memory or the like. The processing procedure of the second mesh information acquisition portion 103 is ordinarily achieved with software, and that software is recorded in a recording medium such as read-only memory (ROM). However, the second mesh information acquisition portion 103 also may be implemented by hardware (dedicated circuit).

The first slice information group acquisition portion 104 acquires a first slice information group, which is a plurality of slice information including no color information, based on the second mesh information acquired by the second mesh information acquisition portion 103. The first slice information group acquisition portion 104 acquires a plurality of slice information that can be obtained by slicing the three-dimensional object constituted by the second mesh information, which is the mesh information obtained by deforming the first mesh information. It is preferable that the spacing between such slice information is constant. Furthermore, the plurality of slice information is preferably perpendicular to the line-of-sight vector. Each piece of slice information is a set of information of points constituting a plane, and the points are packed without any spacing therebetween. Ordinarily, the first slice information group acquisition portion 104 may be implemented with an MPU, a memory or the like. The processing procedure of the first slice information group acquisition portion 104 is ordinarily achieved with software, and that software is recorded in a recording medium such as a ROM. However, the first slice information group acquisition portion 104 also may be implemented by hardware (dedicated circuit).

The color information determination portion 105 determines the color information of points in the plurality of the slice information constituting the first slice information group, the points respectively corresponding to the points of the 3D voxel information stored in the object information storage portion 101. The points respectively correspond to the points of the 3D voxel information are the points in the 3D voxel information, and are the points before deformation. Ordinarily, the color information determination portion 105 may be implemented with an MPU, a memory or the like. The processing procedure of the color information determination portion 105 is ordinarily achieved with software, and that software is recorded in a recording medium such as a ROM. However, the color information determination portion 105 may be implemented by hardware (dedicated circuit).

The corresponding point determining unit 1051 determines points in the 3D voxel information that respectively correspond to the points of the plurality of slice information constituting the first slice information group. Here, the points in the 3D voxel information are the points before deformation. Ordinarily, the corresponding point determining unit 1051 may be implemented with an MPU, a memory or the like. The processing procedure of the corresponding point determining unit 1051 is ordinarily achieved with software, and that software is recorded in a recording medium such as a ROM. However, the corresponding point determining unit 1051 may be implemented by hardware (dedicated circuit).

The color information determining unit 1052 acquires the color information of the points in the 3D voxel information that were determined by the corresponding point determining unit 1051. Ordinarily, the color information determining unit 1052 may be implemented with an MPU, a memory or the like. The processing procedure of the color information determining unit 1052 is ordinarily achieved with software, and that software is recorded in a recording medium such as a ROM. However, the color information determining unit 1052 may be implemented by hardware (dedicated circuit).

The second slice information group acquisition portion 106 sets new color information for the points of the first slice information group acquired by the first slice information group acquisition portion 104, based on the color information of the points that was determined by the color information determination portion 105, to acquire a second slice information group. That is, the second slice information group acquisition portion 106 sets, as new color information, the color information of the points that was determined by the color information determination portion 105 for the points of the first slice information group acquired by the first slice information group acquisition portion 104. The plurality of slice information for which such color information was set is the second slice information group. Ordinarily, the second slice information group acquisition portion 106 may be implemented with an MPU, a memory or the like. The processing procedure of the second slice information group acquisition portion 106 is ordinarily achieved with software, and that software is recorded in a recording medium such as a ROM. However, the second slice information group acquisition portion 106 may be implemented by hardware (dedicated circuit).

The deformed object output portion 107 outputs the second slice information group. "Output" is a concept that includes, for example, display on a display device, printing on a printer, transmission to an external apparatus (e.g., an apparatus including a display device) and storage in a recording medium. "Display" refers to output to a display, a projector and the like. The second slice information group may be displayed in any form. Preferably, the deformed object output portion 107 displays the plurality of slices constituting the second slice information group in decreasing order of depth on a display. The deformed object output portion 107 may be considered to include, or not to include, an output device such as a display. The deformed object output portion 107 may be implemented, for example, by driver software for an output device, or driver software for an output device and the output device.

The operation of the information processing apparatus is described below with reference to the flowchart in FIG. 2.

(Step S201) The instruction receiving portion 102 judges whether input of a deformation instruction and a line-of-sight vector has been received. If such an input has been received, then the procedure advances to Step S202. If such an input has not been received, then the procedure returns to S201.

(Step S202) The first slice information group acquisition portion 104 acquires the line-of-sight vector received in Step S201.

(Step S203) The second mesh information acquisition portion 103 acquires the deformation instruction received in Step S201. Here, the acquired deformation instruction may be, for example, a deformation vector (having orientation and size).

(Step S204) The second mesh information acquisition portion 103 reads the first mesh information from the object information storage portion 101.

(Step S205) The second mesh information acquisition portion 103 deforms the first mesh information read in Step S204 based on the deformation instruction acquired in Step S203 to acquire second mesh information that constitutes the deformed shape. The process of deforming mesh information based on the deformation instruction is a known technique (technique according to the finite element method), and therefore the detailed description thereof has been omitted.

(Step S206) The first slice information group acquisition portion 104 acquires a first slice information group, which is a plurality of slice information, based on the second mesh information acquired in Step S205. The first slice information group acquisition portion 104 slices the three-dimensional object constituted by the second mesh information to obtain information of a plurality of planes. This plane information is the slice information. The slice information is a set of points represented by the coordinate information (x, y, z), and includes no color information. In such a case, the first slice information group acquisition portion 104 acquires a first slice information group, which is a plurality of slice information that is perpendicular to the line-of-sight vector and is sliced with predetermined spacing. Here, the slice information constituting the first slice information group includes no color information.

(Step S207) The second slice information group acquisition portion 106 acquires a second slice information group. The details of this process will be described with reference to the flowchart in FIG. 3.

(Step S208) The deformed object output portion 107 outputs the second slice information group acquired in Step S207. The procedure returns to Step S201.

It should be noted that, in the flowchart in FIG. 2, input of the deformation instruction and the line-of-sight vector was continuously received, and the deformation of the three-dimensional object was displayed in real time. However, input of the line-of-sight vector may be received only once. The line-of-sight vector also may be stored in advance, and may not be input at all.

In addition, in the flowchart in FIG. 2, the process is completed by turning the power off, or by an interrupt indicating the end of the process.

Next, the operation of acquiring the second slice information group in the information processing apparatus (the operation in Step S207 above) is described with reference to the flowchart in FIG. 3.

(Step S301) The second slice information group acquisition portion 106 assigns 1 to a counter i.

(Step S302) The second slice information group acquisition portion 106 judges whether the i-th slice information (unprocessed slice information) is present in the first slice information group. If the i-th slice information is present, then the procedure advances to Step S303. If the i-th slice information is not present, then the procedure returns to an upper-level function.

(Step S303) The second slice information group acquisition portion 106 assigns 1 to a counter j.

(Step S304) The second slice information group acquisition portion 106 judges whether the unprocessed j-th point is present in the i-th slice information. If the j-th point is present, then the procedure advances to Step S305. If the j-th point is not present, then the procedure skips to Step S309. It should be noted that "unprocessed" means that no color information has been set.

(Step S305) The corresponding point determining unit 1051 determines the point corresponding to the j-th point in the i-th slice information and included in the 3D voxel information. The points in the 3D voxel information are the points before deformation. Here, the j-th point is a point after deformation. The details of an example of the algorithm of determining the point in the 3D voxel information will be described later.

(Step S306) The color information determining unit 1052 acquires the color information of the point in the 3D voxel information that was determined in Step S305.

(Step S307) The color information determining unit 1052 sets the color information acquired in Step S306 as the color information of the j-th point in the i-th slice information.

(Step S308) The second slice information group acquisition portion 106 increments the counter j by 1. The procedure returns to Step S304.

(Step S309) The second slice information group acquisition portion 106 increments the counter i by 1. The procedure returns to Step S302.

A specific operation of the information processing apparatus according to this embodiment is described below. In the information processing apparatus of this embodiment, the three-dimensional object may be, for example, an organ such as a heart or a lung. Such a three-dimensional object can be approximated by a set of tetrahedrons. For the sake of simplicity of illustration, the description is therefore given here for the case where the tetrahedron shown in FIG. 4(*a*) is deformed. In FIG. 4(*a*), the tetrahedron has the four points A, B, C, and O. The point P is a given point in the interior of the tetrahedron.

For example, the object information storage portion 101 contains the first mesh information shown in FIG. 5 and the 3D voxel information shown in FIG. 6. The first mesh information may be, for example, a set of information of the points located on the outside and the inside of the tetrahedron (there are spacings between the points). The 3D voxel information is a set of point information that is the information of all the points constituting the tetrahedron shown in FIG. 4(*a*). The point information includes at least position information (x, y, z) and color information ("col$_1$" and the like in FIG. 6).

Here, lets us assume that a user has input a deformation instruction and a line-of-sight vector. The deformation instruction here is input, for example, through a mouse included in the information processing apparatus. Input through the mouse may be, for example, input by dragging the point O of the tetrahedron shown in FIG. 4(*a*) laterally to the left with a predetermined force. By such input, the tetrahedron shown in FIG. 4(*a*) is changed into a tetrahedron as shown in FIG. 4(*b*). Then, the second mesh information acquisition portion 103 deforms the first mesh information in FIG. 5 based on this deformation instruction to acquire second mesh information that constitutes the deformed shape. The second mesh information is shown in FIG. 7. That is, the second mesh information is the information indicating the tetrahedron in FIG. 4(*b*). It should be noted that the process of deforming the first mesh information to acquire the second mesh information is a known technique according to the finite element method, and therefore, the detailed description thereof has been omitted.

Next, the first slice information group acquisition portion 104 acquires a first slice information group, which is a plurality of slice information including no color information, based on the second mesh information acquired by the second mesh information acquisition portion 103. The first slice information group acquisition portion 104 acquires a first slice information group, which is a plurality of slice information that is perpendicular to the line-of-sight vector and is sliced with predetermined spacing therebetween, as shown in FIG. 8. The first slice information group acquisition portion 104 determines the positions "minD" and "maxD" of the three-dimensional object that is to be displayed, and slices the three-dimensional object with a predetermined spacing "D" to obtain a plurality of slice information. The slice information is a set of point information. Further, there is no spacing between the points constituting the slice information. That is, a plane indicated by the slice information is packed densely with point information. The point information here includes the position information (x, y, z) and includes no color information. Consequently, the first slice information group acquisition portion 104 acquires the first slice information group shown in FIG. 9. The first slice information group includes slice information S$_1$, slice information S$_2$, slice information S$_3$, and so on. It should be noted that the reason that the slice information is acquired perpendicularly to the line-of-sight vector is to allow even thinned slice information to be viewed three-dimensionally by the user when viewing a set of the slice information. The reason that slice information that has been thinned out with predetermined spacing is obtained is to increase the speed of display processing. The reason that the slice information is acquired with predetermined spacing is to display a high-quality three-dimensional object.

Next, the process of acquiring the color information is described. As shown in FIGS. 4(*a*) and (*b*), when a given point P in the interior of a mesh element is displaced to P' due to input of a deformation instruction, it is necessary to assign the color information located at the position of P in the 3D voxel information to the color information of P'. If the relative position of arbitrary points in the interior of the mesh from the vertexes does not change before and after deformation, then the positions of the internal points P and P' before and after deformation can be represented as a linear combination of the edges by using the common parameters s, t and u as follows.

$$OP = sOA + tOB + uOC \quad \text{Equation (1)}$$

$$O'P' = sO'A' + tO'B' + uO'C' \quad \text{Equation (2)}$$

Here, the corresponding point determining unit 1051 solves Equation (2) to determine the parameters s, t and u that define the internal point P' from the deformed mesh, and obtains the position P before deformation from Equation (1). Then, the corresponding point determining unit 1051 acquires the color information corresponding to the position P from the 3D voxel information shown in FIG. 6. Then, the color information determining unit 1052 acquires and sets the color information of the points determined by the corresponding point determining unit 1051 that are in the plurality of the slice information constituting the first slice information group. Consequently, the points constituting each of the slice information in FIG. 9 after deformation has color information.

In the above-described process, even if displacement occurs in the nodes (points) constituting the mesh information, or the mesh information is reconfigured, the color information at any internal point can be reproduced, as long as the relative position of the points in the element from the nodes can be determined before and after a simulation.

Next, the deformed object output portion 107 displays the second slice information group. By this processing, the three-dimensional object after receiving the deformation instruction can be displayed in real time. By repeating reception of the deformation instruction and display of the three-dimensional object after deformation, it is possible to realize biological function analysis, real-time simulations of operations and the like in the medical field, for example.

As described above, according to this embodiment, it is possible to render deformation and destruction in a mesh in real time, along with the color information of its surface and interior. Specifically, deformation of a three-dimensional object can be simulated in real time, using the slice information group acquired from 3D voxel information and mesh information. That is, it is possible to perform high-precision rendering of the surface and internal structures of an object by expressing the mesh elements after deformation by overlapping texture-mapped cross sections, using both the voxel data (3D voxel information) of the original image and the mesh data (mesh information) of the target area. Furthermore, according to this embodiment, it is possible to generate a smooth deformation animation on a general-purpose PC, for example, for volume data of 256×256×256 voxels, in accordance with dynamic computational algorithms typified by the finite element method without requiring a dedicated graphics card.

Additionally, the processing of the information processing apparatus according to this embodiment was evaluated. In order to examine the computation time required for rendering, two patterns of volume textures, namely 256×256×256 and 128×128×128 corresponding to four patterns of meshes having the same shape but different levels of detail (the cube of FIG. 10(*a*), having numbers of meshes E of 589, 1104, 4463 and 8468, respectively) were prepared. Considering cases where each of these has a slice spacing D of 1.0 and 2.0, the number of frames rendered per second was measured for all 16 patterns. The number of frames for each of the cases is shown in FIG. 11. It should be appreciated that each of the image data in FIG. 10 also includes color information.

When the number of elements increases, the number of base polygons generated increases, and the number of frames decreases. The number of frames is substantially proportional to the slice spacing D. In the case of using the volume texture of 256×256×256 voxels, the meshes having about up to 2000 elements could achieve a number of frames of at least 10 Hz when the slice spacing D was 2, so that it was possible to present interactively smooth animation for the operation on the object.

Furthermore, the information processing apparatus according to this embodiment is useful for visualization of the surface and internal structures of a three-dimensional object, such as a human organ, acquired by CT or MRI when performing a deformation simulation on the shape of the object. In this respect, the results of applying the information processing apparatus to the shape of a three-dimensional object such as a human organ are described below. For example, FIG. 12(a) shows a result of volume rendering of a myocardial region extracted from a set of two-dimensional images acquired by CT. FIG. 12(b) shows a result of creating a tetrahedral mesh model having the same shape and performing a deformation simulation. Since the grey values are reflected, the properties of the microstructure of a coronary artery or the like, or the object surface after deformation are rendered with high definition. Furthermore, deformation of the internal structure (cardiac lumen) can be observed by varying the value of α. This applies also to the rest of the embodiments. It should be appreciated that each of the image data in FIG. 12 also includes color information.

Furthermore, the information processing apparatus according to this embodiment is useful not only for the simulation of deformation of three-dimensional objects such as organs, but also for a wide range of computer graphics-related applications including creating animations for entertainment purposes, making is possible to greatly extend the applicable scope of volume visualization. This also applies to the rest of the embodiments.

Furthermore, it should be appreciated that the information processing apparatus according to this embodiment can achieve higher speed processing by performing acquisition of the first slice information group and acquisition of the second slice information group in parallel processing. This also applies to the rest of the embodiments.

Furthermore, the data structure of the data stored in the object information storage portion of the information processing apparatus according to this embodiment is a data structure of a three-dimensional object, including mesh information, which is information of a three-dimensional mesh of a three-dimensional object associated with all or a portion of 3D voxel information, which is a volume texture of the three-dimensional object. By performing the above-described process for data having this data structure, it is possible to render deformation and destruction of a three-dimensional object in real time, along with the color information of its surface and interior. This also applies to the rest of the embodiments.

Moreover, the process according to this embodiment may be achieved with software. This software may be distributed by way of a software download or the like. Furthermore, such software may be disseminated by being recorded in a recording medium such as a CD-ROM. It should be noted that this also applies to the rest of the embodiments in this specification. Additionally, the software with which the information processing apparatus according to this embodiment is implemented may be the following program. That is, this program is a program for letting a computer perform: an instruction receiving step of receiving a deformation instruction for instructing deformation of a three-dimensional object from an input unit or the like; a second mesh information acquisition step of deforming first mesh information that is stored in a recording medium, based on the deformation instruction to acquire second mesh information that constitutes the deformed shape; a first slice information group acquisition step of acquiring a first slice information group, which is a plurality of slice information including no color information, based on the second mesh information; a color information determination step of determining color information of points of the plurality of slice information constituting the first slice information group, the points respectively corresponding to points of 3D voxel information that is stored; a second slice information group acquisition step of setting new color information for the points of the first slice information group acquired in the first slice information group acquisition step, based on the color information of the points that was determined in the color information determination step, to acquire a second slice information group; and a deformed object output step of outputting the second slice information group to an output apparatus or the like.

Embodiment 2

In Embodiment 2, a method is described by which an information processing apparatus acquires a slice information group having color information from 3D voxel information before deformation, and obtains a display of the deformed three-dimensional object from that slice information group and mesh information after deformation. The information processing apparatus according to Embodiment 2 and the information processing apparatus according to Embodiment 1 are similar to each other in that they appropriately combine the slice information group and the mesh information to realize deformation of a three-dimensional object, but are different in their algorithms of obtaining the deformed three-dimensional object.

FIG. 13 is a block diagram showing the information processing apparatus according to this embodiment. The information processing apparatus includes an object information storage portion 101, an instruction receiving portion 102, a first slice information group acquisition portion 1303, a second mesh information acquisition portion 1304, a second slice information group acquisition portion 1305, a color information determination portion 1306, a third slice information group acquisition portion 1307, and a deformed object output portion 1308. The color information determination portion 1306 includes a corresponding point determining unit 13061, and a color information determining unit 13062.

In the case where the instruction receiving portion 102 receives a deformation instruction, the first slice information group acquisition portion 1303 acquires a first slice information group, which is a plurality of slice information, based on the 3D voxel information in the object information storage portion 101. Specifically, the first slice information group acquisition portion 1303 acquires a plurality of slice information, which is the information representing a plurality of slices obtained by slicing the three-dimensional object expressed by the 3D voxel information. It is preferable that the spacing between the plurality of information constituting the first slice information group is constant. Furthermore, it is preferable that, in the case where the instruction receiving portion 102 receives a deformation instruction, the first slice information group acquisition portion 1303 acquires a first slice information group, which is a plurality of slice information perpendicular to the line-of-sight vector, based on the 3D voxel information. The information of the points of the slice information constituting the first slice information group includes color information. Ordinarily, the first slice information group acquisition portion 1303 may be implemented with an MPU, a memory or the like. The processing procedure of the first slice information group acquisition portion 1303 is ordinarily achieved with software, and that software is recorded in a recording medium such as a ROM. However, the first slice information group acquisition portion 1303 may be implemented by hardware (dedicated circuit).

In the case where the instruction receiving portion 102 receives a deformation instruction, the second mesh information acquisition portion 1304 deforms the first mesh information based on that deformation instruction to acquire second mesh information that constitutes the deformed shape. Ordinarily, the second mesh information acquisition portion 1304 may be implemented with an MPU, a memory or the like. The processing procedure of the second mesh information acquisition portion 1304 is ordinarily achieved with software, and that software is recorded in a recording medium such as a ROM. However, the second mesh information acquisition portion 1304 may be implemented by hardware (dedicated circuit).

The second slice information group acquisition portion 1305 deforms the plurality of slice information based on the second mesh information to acquire a second slice information group, which is a plurality of new slice information. The points of the slice information constituting the second slice information group may not include color information. Ordinarily, the second slice information group acquisition portion 1305 may be implemented with an MPU, a memory or the like. The processing procedure of the second slice information group acquisition portion 1305 is ordinarily achieved with software, and that software is recorded in a recording medium such as a ROM. However, the second slice information group acquisition portion 1305 may be implemented by hardware (dedicated circuit).

The color information determination portion 1306 acquires the color information of points in the plurality of slice information constituting the first slice information group, the points respectively corresponding to the points of the plurality of new slice information constituting the second slice information group, and determines the color information of the points in the plurality of new slice information constituting the second slice information group, based on the color information of the acquired points.

The corresponding point determining unit 13061 determines points in the plurality of slice information constituting the first slice information group, the points respectively corresponding to the points in the plurality of new slice information constituting the second slice information group. Ordinarily, the corresponding point determining unit 13061 may be implemented with an MPU, a memory or the like. The processing procedure of the corresponding point determining unit 13061 is ordinarily achieved with software, and that software is recorded in a recording medium such as a ROM. However, the corresponding point determining unit 13061 may be implemented by hardware (dedicated circuit).

The color information determining unit 13062 acquires the color information of the points that are in the plurality of slice information constituting the first slice information group and were determined by the corresponding point determining unit 13061. Ordinarily, the color information determining unit 13062 may be implemented with an MPU, a memory or the like. The processing procedure of the color information determining unit 13062 is ordinarily achieved with software, and that software is recorded in a recording medium such as a ROM. However, the color information determining unit 13062 may be implemented by hardware (dedicated circuit).

The third slice information group acquisition portion 1307 sets new color information for the points in the second slice information group acquired by the second slice information group acquisition portion 1305, based on the color information of the points that was determined by the color information determination portion 1306, to acquire a third slice information group. The third slice information group is a group of information in which color information is set for the points in the second slice information group. Ordinarily, the third slice information group acquisition portion 1307 may be implemented with an MPU, a memory or the like. The processing procedure of the third slice information group acquisition portion 1307 is ordinarily achieved with software, and that software is recorded in a recording medium such as a ROM. However, the third slice information group acquisition portion 1307 may be implemented by hardware (dedicated circuit).

The deformed object output portion 1308 outputs the third slice information group. "Output" is a concept that includes, for example, display on a display device, printing on a printer, transmission to an external apparatus (e.g., an apparatus including a display device) and storage on a recording medium. "Display" refers to output to a display, a projector and the like. The third slice information group may be displayed in any form. Preferably, the deformed object output portion 1308 outputs the plurality of slices constituting the third slice information group in decreasing order of depth on a display. The deformed object output portion 1308 may be considered to include, or not to include, an output device such as a display. The deformed object output portion 1308 may be implemented, for example, by driver software for an output device, or driver software for an output device and the output device.

The operation of the information processing apparatus according to this embodiment is described below with reference to the flowchart in FIG. 14.

(Step S1401) The instruction receiving portion 102 judges whether input of a deformation instruction and a line-of-sight vector has been received. If such an input has been received, then the procedure advances to Step S1402. If such an input has not been received, then the procedure returns to S1401.

(Step S1402) The first slice information group acquisition portion 1303 acquires the line-of-sight vector received in Step S1401.

(Step S1403) The second mesh information acquisition portion 1304 acquires the deformation instruction received in Step S1401. Here, the deformation instruction may be, for example, a deformation vector (having orientation and size).

(Step S1404) The second mesh information acquisition portion 1304 reads the first mesh information from the object information storage portion 101.

(Step S1405) The second mesh information acquisition portion 1304 deforms the first mesh information read in Step S1404, based on the deformation instruction acquired in Step S1403 to acquire second mesh information that constitutes the deformed shape.

(Step S1406) The first slice information group acquisition portion 1303 reads the 3D voxel information from the object information storage portion 101, and acquires, from that 3D voxel information, a first slice information group, which is a plurality of slice information. In such a case, the first slice information group acquisition portion 1303 acquires a first slice information group, which is a plurality of slice information that is perpendicular to the line-of-sight vector and is sliced with predetermined spacing. Here, the points in the slice information constituting the first slice information group include color information. The color information of the points is the color information of the points respectively corresponding to the points included in the 3D voxel information.

(Step S1407) The second slice information group acquisition portion 1305 deforms the plurality of slice information included in the first slice information group acquired in Step S1406, based on the second mesh information acquired in Step S1405 to acquire a second slice information group, which is a plurality of new slice information.

(Step S1408) The third slice information group acquisition portion 1307 acquires a third slice information group. The details of this process will be described with reference to the flowchart in FIG. 15.

(Step S1409) The deformed object output portion 1308 outputs the third slice information group acquired in Step S1408. The procedure returns to Step S1401.

It should be noted that, in the flowchart in FIG. 14, input of the deformation instruction and the line-of-sight vector was continuously received, and the deformation of the three-dimensional object was displayed in real time. However, input of the line-of-sight vector may be received only once. The line-of-sight vector also may be stored in advance, and may not be input at all.

In addition, in the flowchart in FIG. 14, the process is completed by turning the power off, or by an interrupt indicating the end of the process.

Next, the operation of acquiring the third slice information group in the information processing apparatus (the operation in Step S1408 above) is described with reference to the flowchart in FIG. 15.

(Step S1501) The third slice information group acquisition portion 1307 assigns 1 to a counter i.

(Step S1502) The third slice information group acquisition portion 1307 judges whether the i-th slice information (unprocessed slice information) is present in the second slice information group. If the i-th slice information is present, then the procedure advances to Step S1503. If the i-th slice information is not present, then the procedure returns to an upper-level function.

(Step S1503) The third slice information group acquisition portion 1307 assigns 1 to a counter j.

(Step S1504) The third slice information group acquisition portion 1307 judges whether the unprocessed j-th point is present in the i-th slice information. If the j-th point is present, then the procedure advances to Step S1505. If the j-th point is not present, then the procedure skips to Step S1509.

(Step S1505) The corresponding point determining unit 13061 determines the point (point before deformation) corresponding to the j-th point in the i-th slice information and included in the plurality of slice information constituting the first slice information group.

(Step S1506) The color information determining unit 13062 acquires the color information of the point determined in Step S1505. Here, the points in the plurality of slice information constituting the first slice information group include color information.

(Step S1507) The color information determining unit 13062 sets the color information acquired in Step S1506 as the color information of the j-th point in the i-th slice information.

(Step S1508) The third slice information group acquisition portion 1307 increments the counter j by 1. The procedure returns to Step S1504.

(Step S1509) The third slice information group acquisition portion 1307 increments the counter i by 1. The procedure returns to Step S1502.

A specific operation of the information processing apparatus according to this embodiment is described below. The information processing apparatus according to this embodiment is described for the case where the tetrahedron shown in FIG. 4(a) is deformed, as in Embodiment 1.

For example, the object information storage portion 101 contains the first mesh information shown in FIG. 5 and the 3D voxel information shown in FIG. 6.

Here, lets us assume that a user has input a deformation instruction and a line-of-sight vector. By such input, the tetrahedron shown in FIG. 4(a) is changed into a tetrahedron as shown in FIG. 4(b). Then, the second mesh information acquisition portion 1304 deforms the first mesh information in FIG. 5 based on this deformation instruction to acquire second mesh information that constitutes the deformed shape. The second mesh information is shown in FIG. 6.

Next, the first slice information group acquisition portion 1303 acquires, from the 3D voxel information, a first slice information group, which is a plurality of slice information perpendicular to the line-of-sight vector. FIG. 16 shows the first slice information group. The first slice information group includes slice information $S_{161}$, slice information $S_{162}$, slice information $S_{163}$, and so on. The slice information $S_{161}$, and so on here also include color information. That is, an example of the structure of the information of the points constituting the slice information $S_{161}$, and so on is "(x, y, z, col)". Additionally, since the process of extracting the slice information from the 3D voxel information is a known technique, the detailed description thereof has been omitted here. Further, the process of extracting the slice information from the 3D voxel information is generally the same as the process described in Embodiment 1.

Next, the second mesh information acquisition portion 1304 deforms the first mesh information based on the deformation instruction received by the instruction receiving portion 102 to acquire second mesh information that constitutes the deformed shape. The second mesh information may be, for example, information as shown in FIG. 7.

Next, the second slice information group acquisition portion 1305 deforms the plurality of slice information (first slice information group) based on the second mesh information to acquire a second slice information group, which is a plurality of new slice information. During this deformation, color information is not taken into consideration. That is, the second slice information group acquisition portion 1305 acquires the second slice information group by using only, for example, the position information of the slice information constituting the first slice information group. The slice information constituting the second slice information group includes no color information. An example of the structure of the points of this slice information is "(x, y, z, −1)". The color information "−1" here means including no color information.

Next, the color information determination portion 1306 acquires color information of points in the plurality of slice information constituting the first slice information group, the points respectively corresponding to points of the plurality of new slice information constituting the second slice information group, and determines color information of the points of the plurality of new slice information constituting the second slice information group based on the acquired color information of the points. Then, the third slice information group acquisition portion 1307 updates the color information "−1" above to the determined color information. Through this processing, the third slice information group acquisition portion 1307 acquires a third slice information group.

Then, the deformed object output portion 1308 outputs the third slice information group.

As described above, according to this embodiment, it is possible to render deformation and destruction occurred in a mesh substantially in real time, along with the color information of its surface and interior.

It should be noted that, in this embodiment, it is preferable that the spacing between the plurality of slice information constituting the slice information group is constant, as in Embodiment 1. It is also preferable that the deformed object output portion outputs a plurality of slices constituting the third slice information group in decreasing order of depth on a display. This also applies to the rest of the embodiments.

Furthermore, the software with which the information processing apparatus according to this embodiment is implemented may be the following program. That is, this program is a program for letting a computer perform: an instruction receiving step of receiving a deformation instruction for instructing deformation of a three-dimensional object from an input unit or the like; a first slice information group acquisition step of acquiring, in the case where the deformation instruction is received in the instruction receiving step, a first slice information group, which is a plurality of slice information, based on 3D voxel information that is stored in a recording medium; a second mesh information acquisition step of deforming the first mesh information based on the deformation instruction to acquire second mesh information that constitutes the deformed shape; a second slice information group acquisition step of deforming the plurality of slice information based on the second mesh information to acquire a second slice information group, which is a plurality of new slice information; a color information determination step of acquiring color information of points in the plurality of slice information constituting the first slice information group, the points respectively corresponding to points of the plurality of new slice information constituting the second slice information group, and determining color information of the points of the plurality of new slice information constituting the second slice information group based on the acquired color information of the points; a third slice information group acquisition step of setting new color information for the points of the second slice information group acquired in the second slice information group acquisition step, based on the color information of the points that was determined in the color information determination step, to acquire a third slice information group; and a deformed object output step of outputting the third slice information group to an output apparatus or the like.

Embodiment 3

In this embodiment, an example is described for the case where the slice information, rather than the 3D voxel information, is prepared in advance.

FIG. 17 is a block diagram showing an information processing apparatus according to this embodiment. The information processing apparatus includes an object information storage portion 1701, an instruction receiving portion 1702, a second mesh information acquisition portion 1304, a second slice information group acquisition portion 1305, a color information determination portion 1306, a third slice information group acquisition portion 1307, and a deformed object output portion 1308.

The object information storage portion 1701 contains first mesh information, which is information of a three-dimensional mesh of a three-dimensional object, and a first slice information group, which is a plurality of slice information obtained by slicing the volume texture of the three-dimensional object. The object information storage portion 1701 may be preferably a nonvolatile recording medium, but also may be implemented with a volatile recording medium. It should be noted that the volume texture or slice information of the three-dimensional object may be, for example, data captured with a medical device such as a CT, MRI or PET device.

The instruction receiving portion 1702 receives, for example, a deformation instruction for instructing deformation of the three-dimensional object. The deformation instruction, a line-of-sight vector and the like may be input through any input unit such as a numeric keypad, keyboard, mouse (including a 3D mouse) and menu screen, or may be input through a line-of-sight input device or the like. The instruction receiving portion 1702 may be implemented, for example, with a device driver for an input unit such as a numeric keypad or a keyboard, or control software for a menu screen.

The operation of the information processing apparatus according to this embodiment is described below with reference to the flowchart in FIG. 18.

(Step S1801) The instruction receiving portion 1702 judges whether input of the deformation instruction has been received. If such an input has been received, then the procedure advances to Step S1802. If such an input has not been received, then the procedure returns to S1801.

(Step S1803) The second mesh information acquisition portion 1304 acquires the deformation instruction received in Step S1801. Here, the deformation instruction may be, for example, a deformation vector (having orientation and size).

(Step S1804) The second mesh information acquisition portion 1304 reads the first mesh information from the object information storage portion 1701.

(Step S1805) The second mesh information acquisition portion 1304 deforms the first mesh information read in Step S1804, based on the deformation instruction acquired in Step S1803 to acquire second mesh information that constitutes the deformed shape.

(Step S1806) The second slice information group acquisition portion 1305 deforms the plurality of slice information included in the stored first slice information group, based on the second mesh information acquired in Step S1805 to acquire a second slice information group, which is a plurality of new slice information.

(Step S1807) The third slice information group acquisition portion 1307 acquires a third slice information group. The process in Step S1807 is the same as the process in Step S1408. The details of this process have been described with reference to the flowchart in FIG. 15.

(Step S1808) The deformed object output portion 1308 outputs the third slice information group acquired in Step S1807.

A specific operation of the information processing apparatus according to this embodiment is described below. In the information processing apparatus according to this embodiment, the object information storage portion 1701 may hold, for example, the first mesh information shown in FIG. 5 and the first slice information group shown in FIG. 16. A third slice information group is acquired based on the received deformation instruction through a process that is substantially the same as the process of Embodiment 2. Then, the deformed object output portion 1308 displays the third slice information group.

As described above, according to this embodiment, it is possible to render deformation and destruction in a mesh substantially in real time, along with the color information of its surface and interior. Moreover, according to this embodiment, the first slice information group is held in advance, so that it is possible to simulate deformation of a 3D object at high speed. Furthermore, since there is no need to hold 3D voxel information, the information processing apparatus can perform simulations with a small amount of memory capacity.

Furthermore, the software with which the information processing apparatus according to this embodiment is implemented may be the following program. That is, this program is a program for letting a computer perform: an instruction receiving step of receiving a deformation instruction for instructing deformation of a three-dimensional object from an input unit or the like; a second mesh information acquisition step of deforming first mesh information that is stored in a recording medium, based on the deformation instruction to acquire second mesh information that constitutes the deformed shape; a second slice information group acquisition step of deforming a first slice information group that is stored in a recording medium, based on the second mesh information to acquire a second slice information group, which is a plurality of new slice information; a color information determination step of acquiring color information of points in the plurality of slice information constituting the first slice information group, the points respectively corresponding to points of the plurality of new slice information constituting the second slice information group, and determining color information of the points of the plurality of new slice information constituting the second slice information group based on the acquired color information of the points; a third slice information group acquisition step of setting new color information for the points of the second slice information group acquired in the second slice information group acquisition step, based on the color information of the points that was determined in the color information determination step, to acquire a third slice information group; and a deformed object output step of outputting the third slice information group to an output apparatus or the like.

In each of the above-described embodiments, each process (each function) may be carried out by centralized processing using a single apparatus (system), or alternatively, may be carried out by distributed processing using a plurality of apparatuses.

The above-mentioned program may be executed by a single or a plurality of computers. In other words, the program may be performed by either centralized processing or distributed processing.

It should be appreciated that the present invention is not limited to the embodiments set forth herein, and various modifications may be made and also fall into the scope of the present invention.

That is, a data structure of the three-dimensional object according to the present invention includes mesh information, which is a three-dimensional mesh information of a three-dimensional object associated with all or a part of 3D voxel information, which is a volume texture of the aforementioned three-dimensional object. Using this feature of the data structure of the three-dimensional object, it is possible to simulate the three-dimensional object at high speed. There are various methods of associating the mesh information and the 3D voxel information. For example, they may be linked to each other. Alternatively, they may simply be stored in a predetermined recording media. If the information processing apparatus can use both the mesh information and the 3D voxel information of a three-dimensional object through the above-described process, then the two types of data can be considered to be associated with each other. Specifically, an information processing apparatus according to the present invention is an information processing apparatus including: an object information storage portion that contains first mesh information, which is information of a three-dimensional mesh of a three-dimensional object, and all or a portion of 3D voxel information, which is a volume texture of the three-dimensional object; an instruction receiving portion that receives a deformation instruction for instructing deformation of the three-dimensional object; a second mesh information acquisition portion that deforms the first mesh information based on the deformation instruction to acquire second mesh information that constitutes the deformed shape; a second slice information group acquisition portion that acquires a second slice information group based on the second mesh information and all or a portion of the 3D voxel information; and a deformed object output portion that outputs the second slice information group.

INDUSTRIAL APPLICABILITY

As described above, the information processing apparatus according to the present invention has the effect of rendering deformation and the like occurred in a mesh in real time, along with the color information of its surface and interior, and is useful, for example, as a simulation apparatus for three-dimensional objects.

BRIEF DESCRIPTION OF THE DRAWINGS

FIG. 5 shows the first mesh information of the same information processing apparatus.

Figure 6:
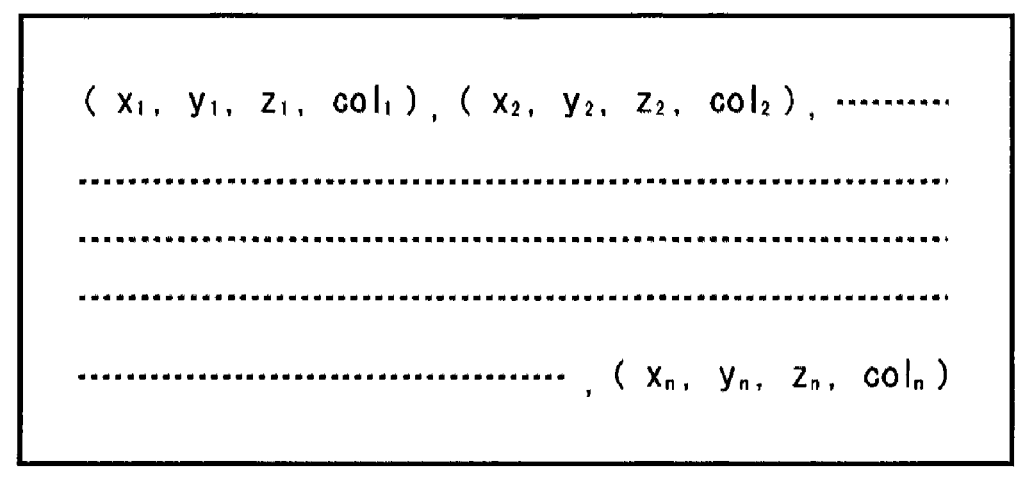

FIG. 6 shows the 3D voxel information of the same information processing apparatus.

FIG. 7 shows the second mesh information of the same information processing apparatus.

Figure 1:
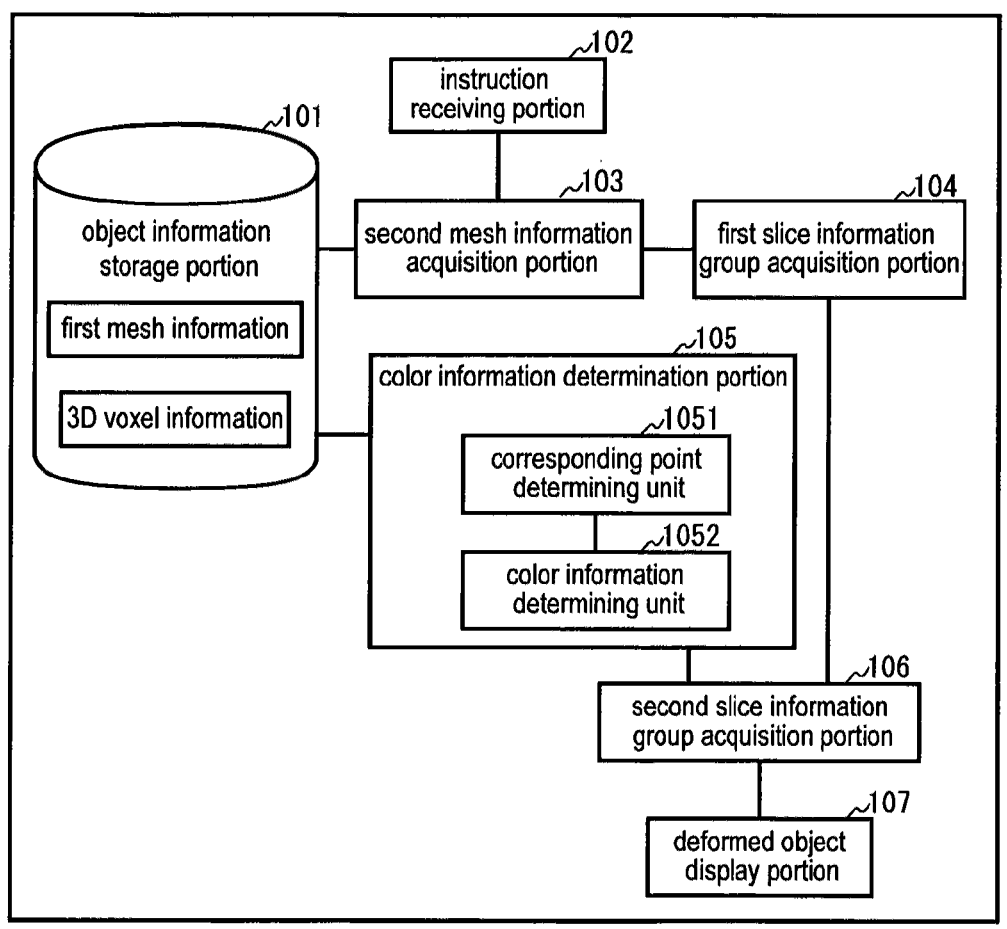
FIG. 1 is a block diagram showing an information processing apparatus according to Embodiment 1.
Figure 2:
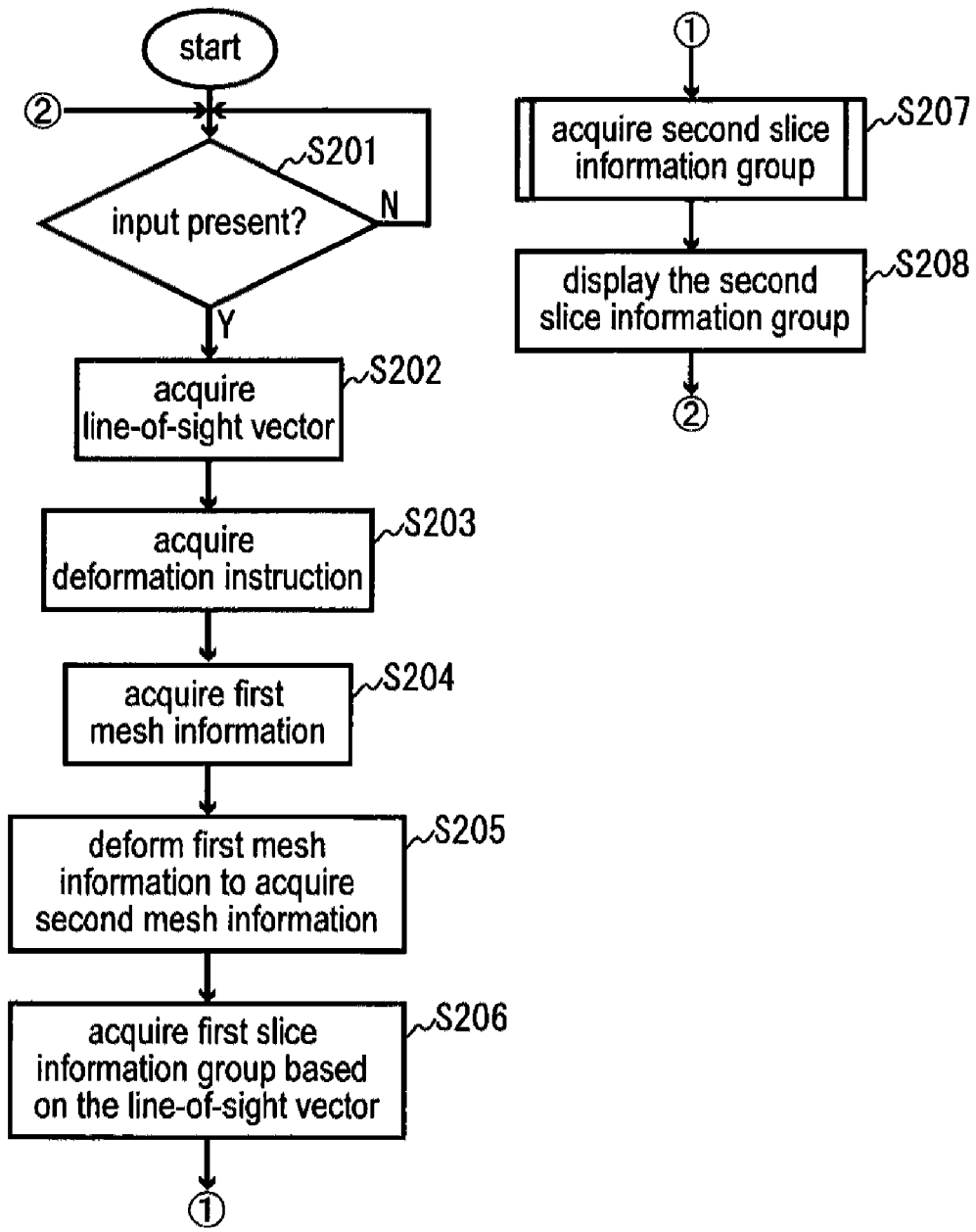
FIG. 2 is a flowchart illustrating the operation of the same information processing apparatus.
Figure 3:
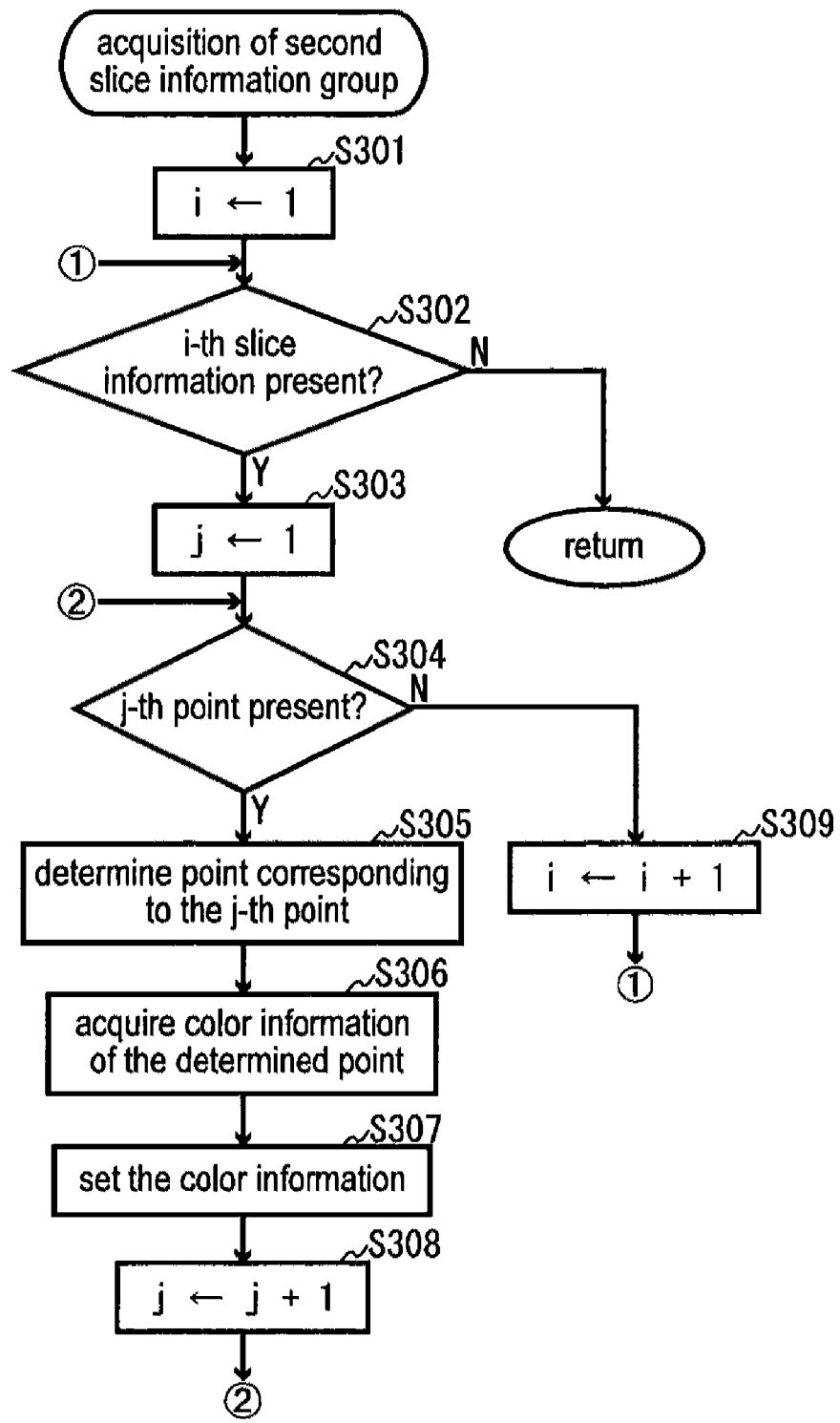
FIG. 3 is a flowchart illustrating the details of the process of acquiring the slice information group of the same information processing apparatus.
Figure 4:
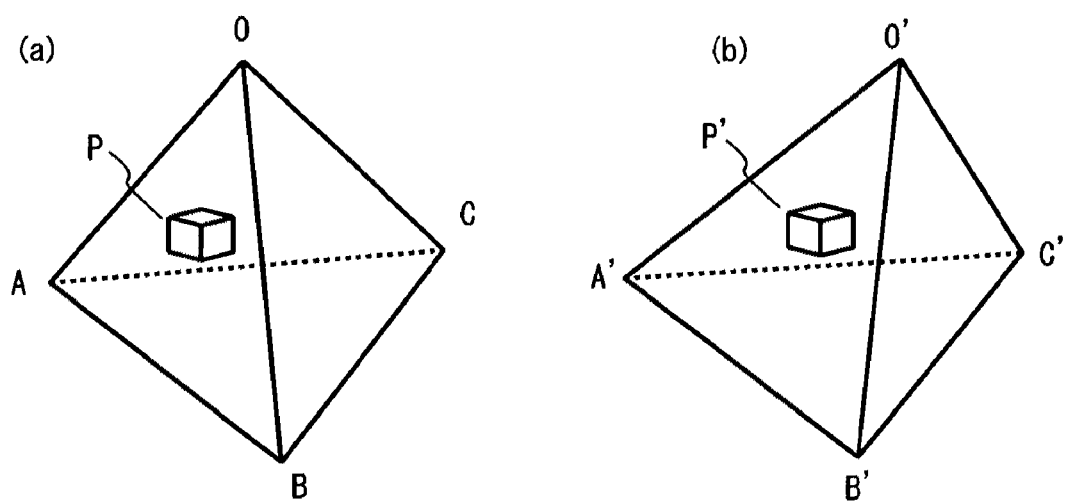
FIG. 4 shows a tetrahedron constituting the three-dimensional object that is to be deformed by the same information processing apparatus.
Figure 8:
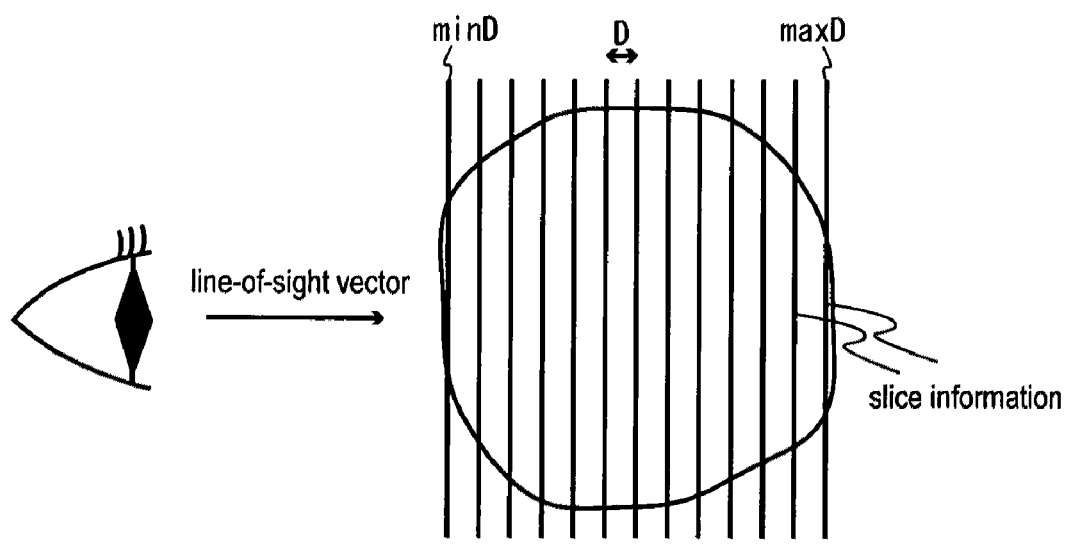
FIG. 8 is a diagram showing an image during acquisition of the first slice information group of the same information processing apparatus.
Figure 9:
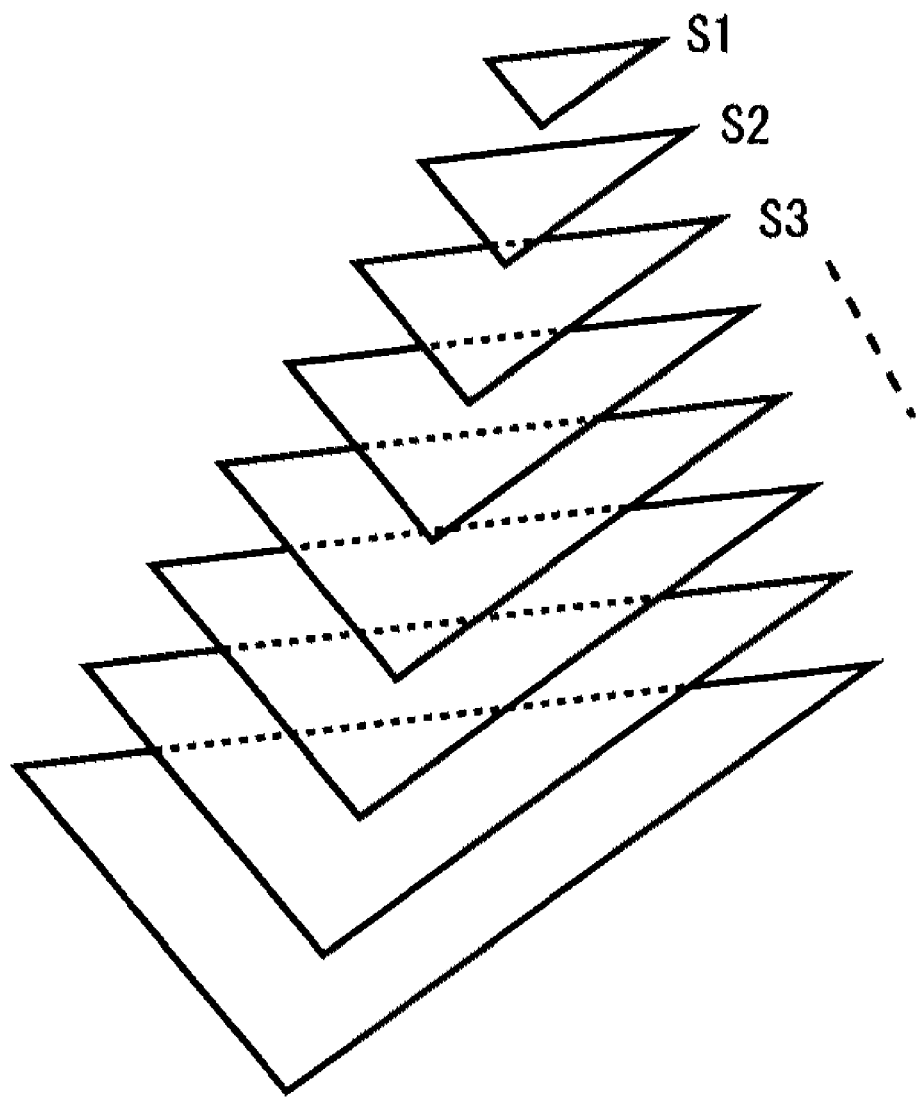
FIG. 9 is a diagram showing the first slice information group of the same information processing apparatus.
Figure 10A:
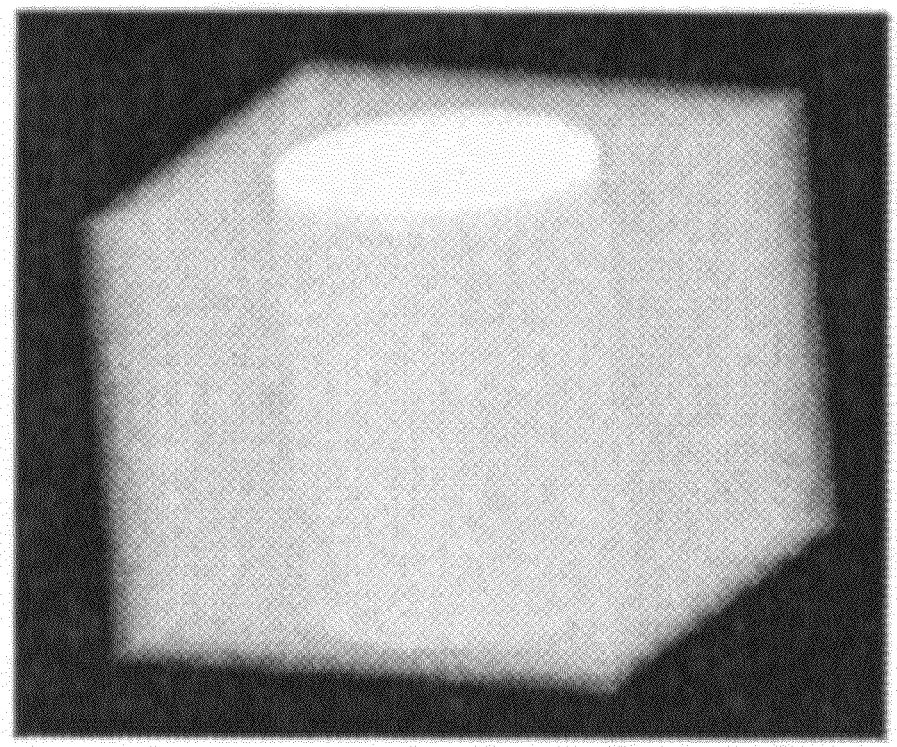
FIGS. 10a, 10b and 10c are views of the three-dimensional object that is to be deformed by the same information processing apparatus.
Figure 10B:
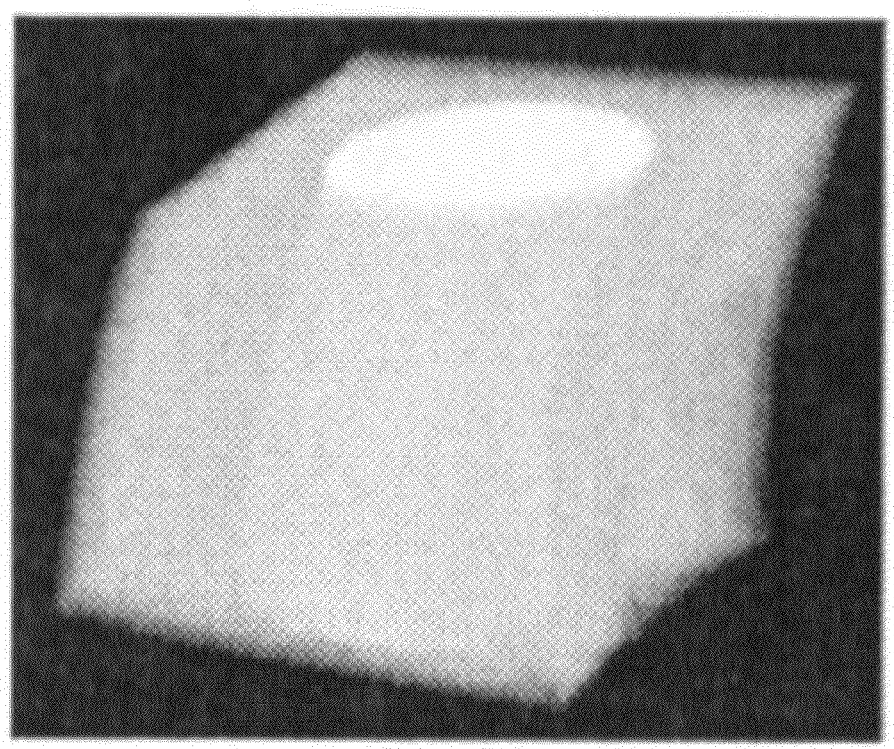
Figure 10C:
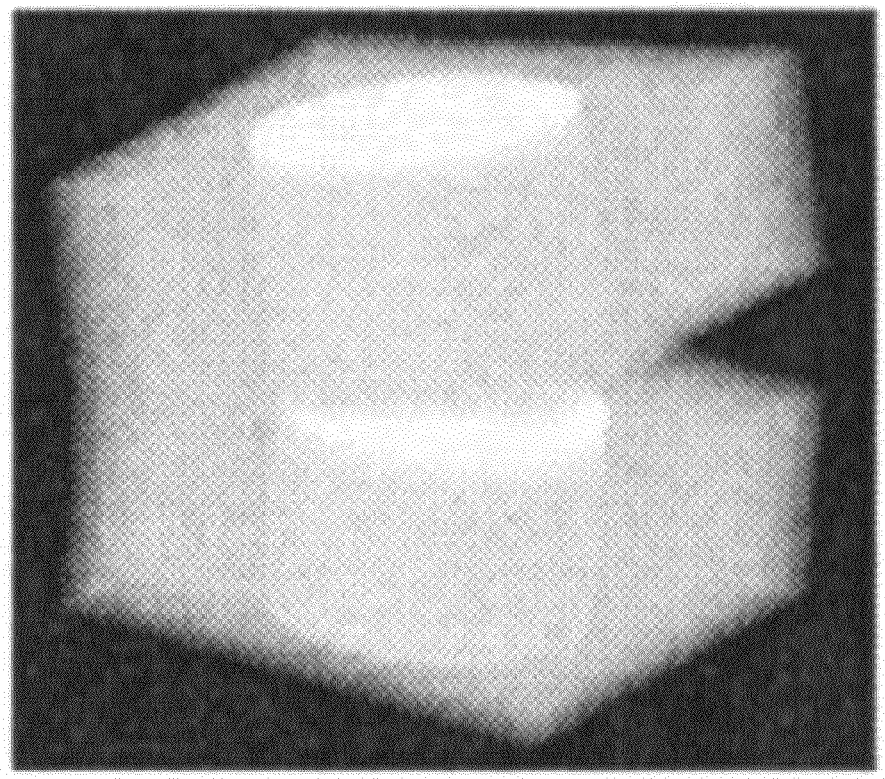
Figure 11:
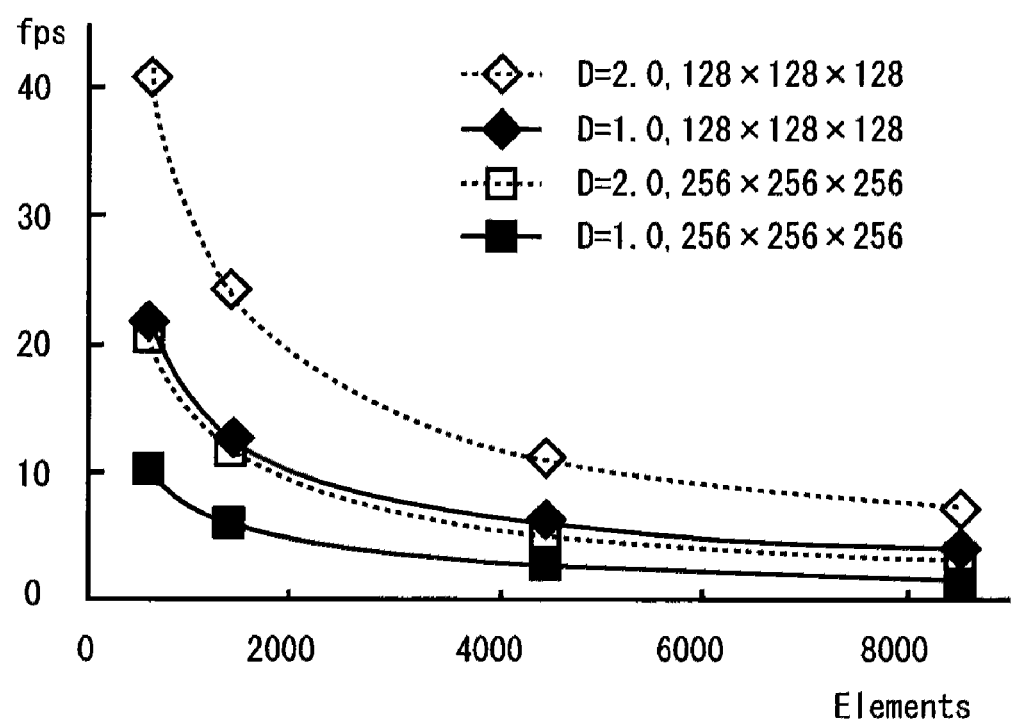
FIG. 11 is a graph showing data for examining the calculation time.
Figure 12A:
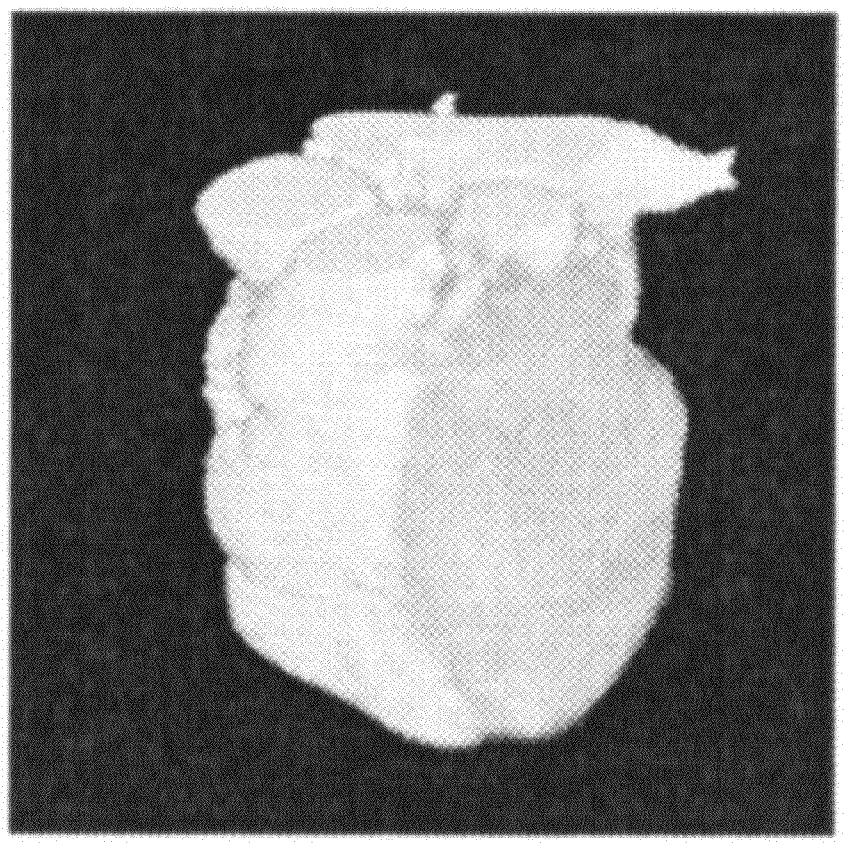
FIGS. 12a and 12b are views of the myocardial region of the object to be deformed by the same information processing apparatus.
Figure 12B:
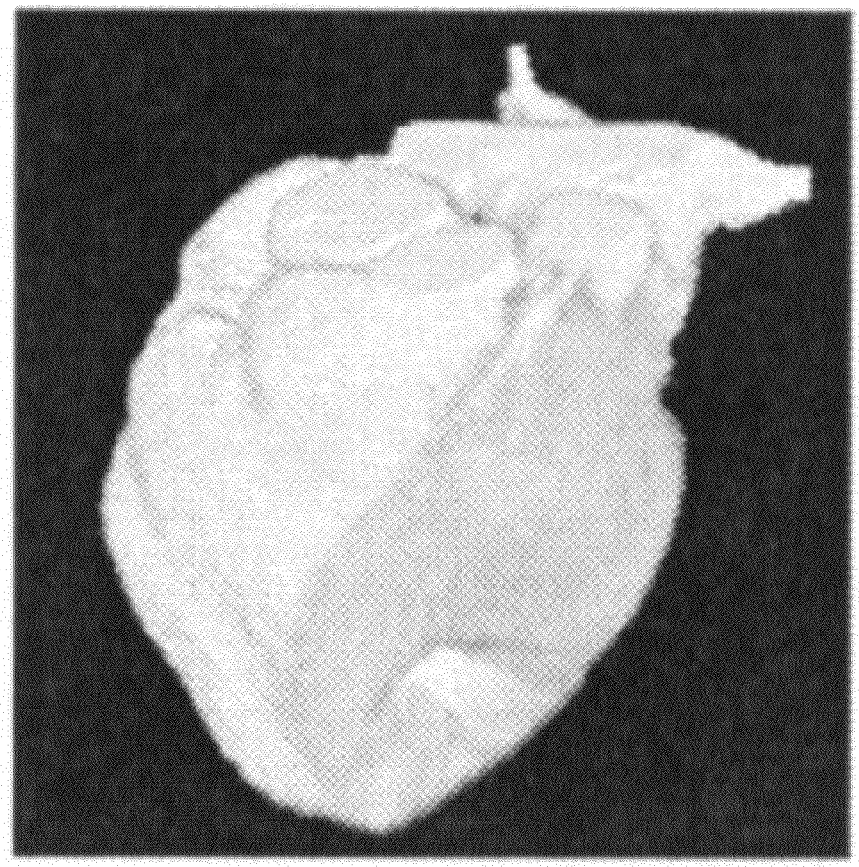
Figure 13:
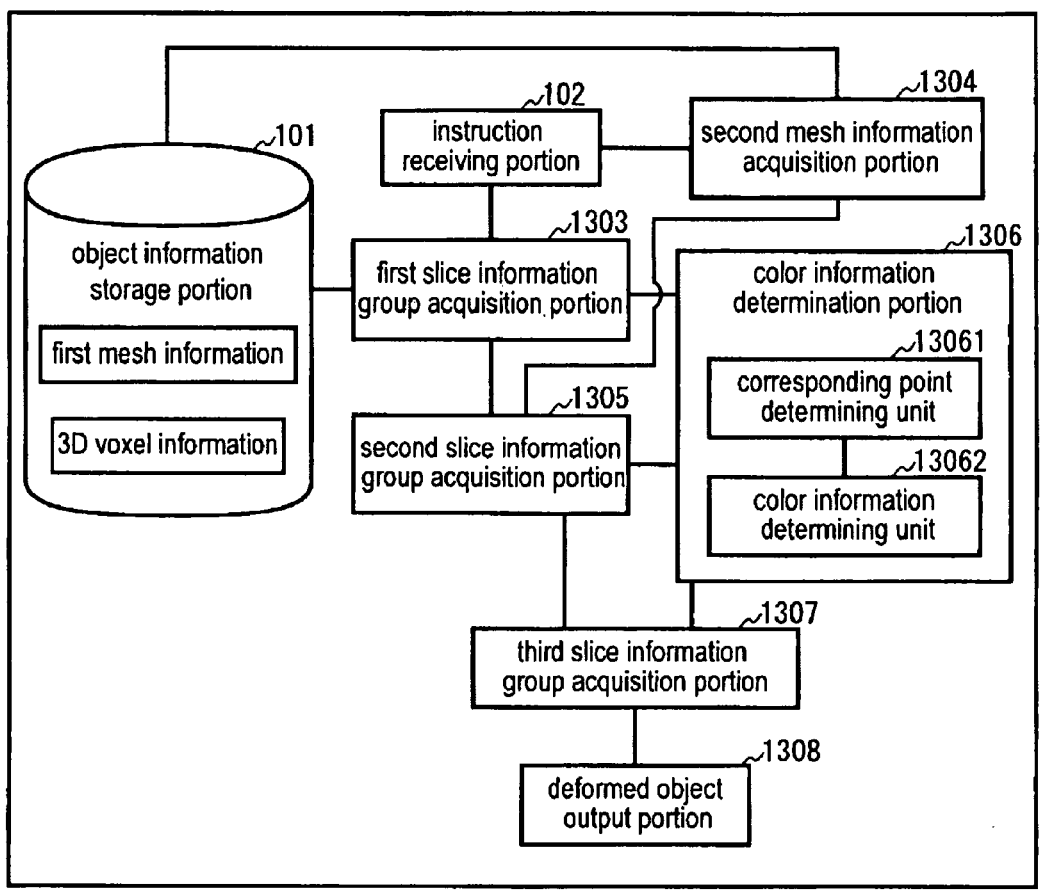
FIG. 13 is a block diagram showing an information processing apparatus according to Embodiment 2.
Figure 14:
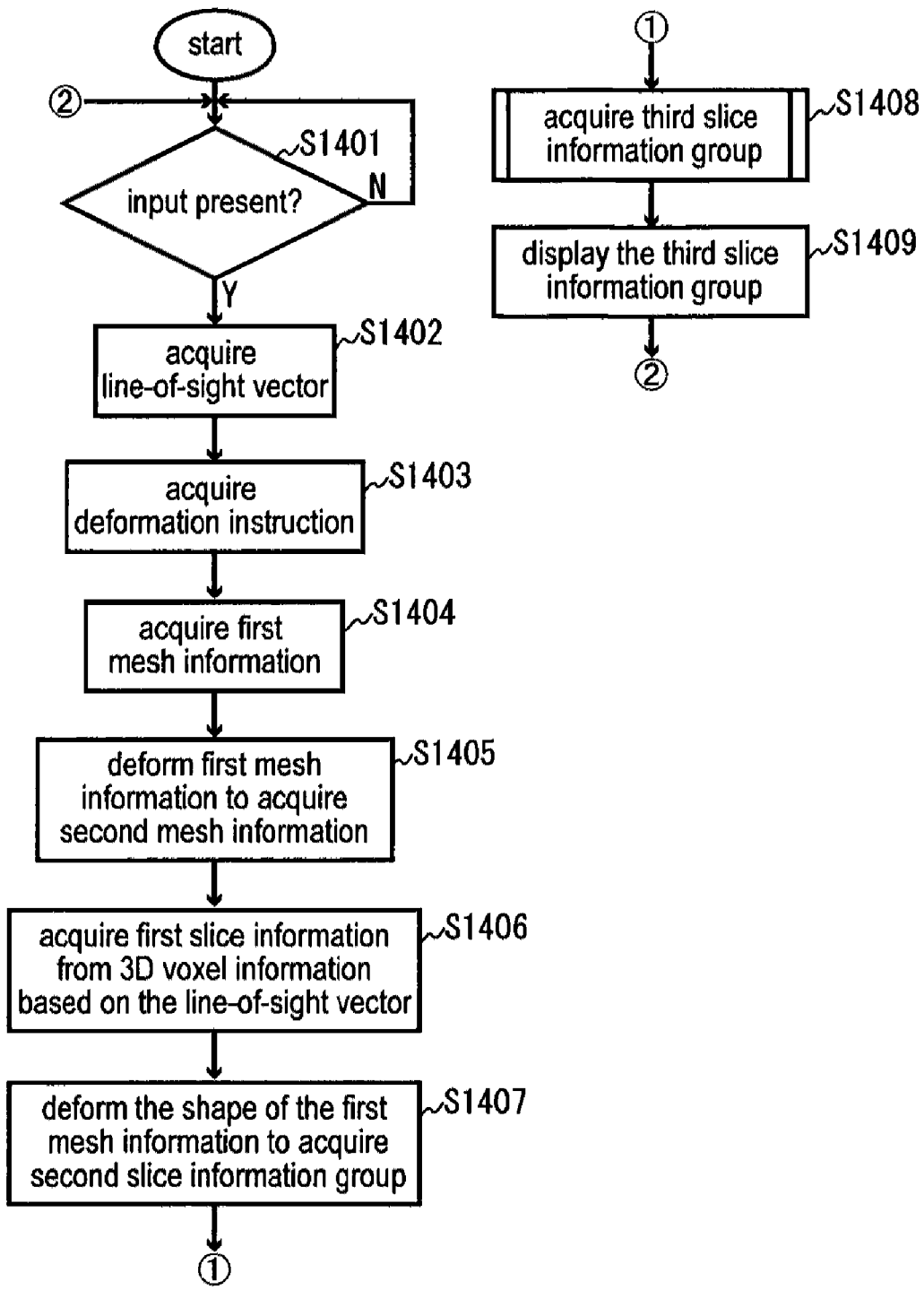
FIG. 14 is a flowchart illustrating the operation of the same information processing apparatus.
Figure 15:
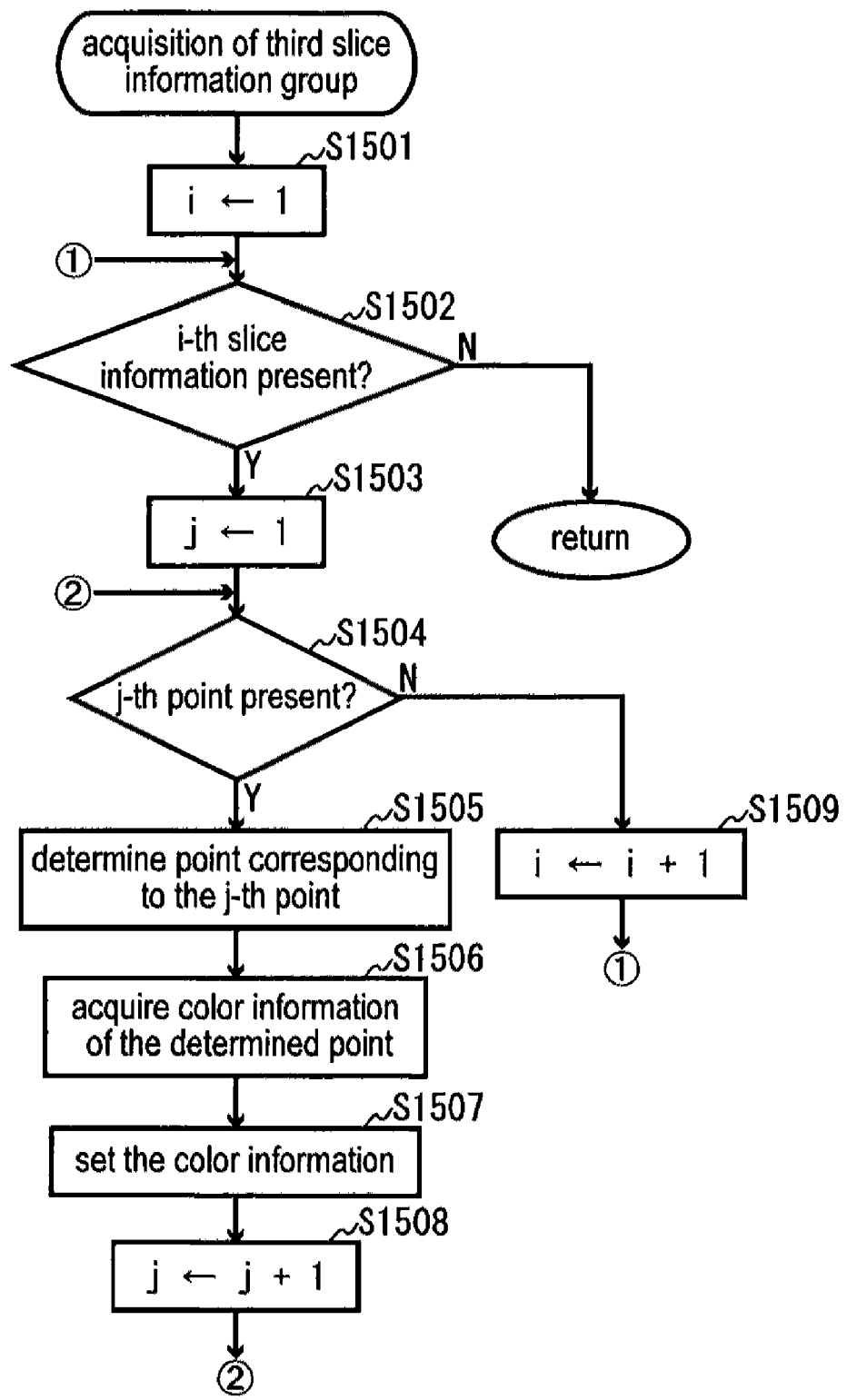
FIG. 15 is a flowchart illustrating the details of the process of acquiring the slice information group of the same information processing apparatus.
Figure 16:
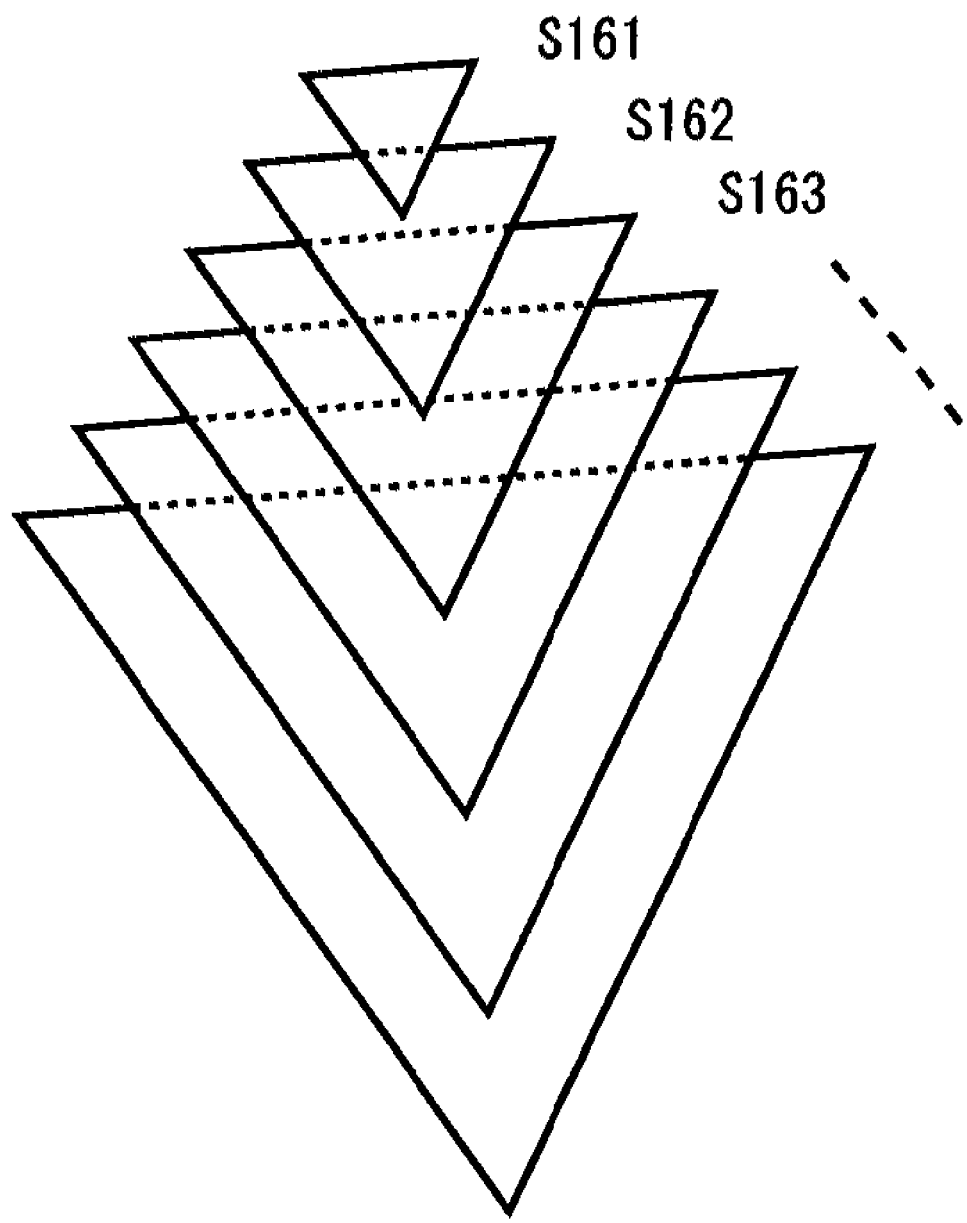
FIG. 16 shows the first slice information group of the same information processing apparatus.
Figure 17:
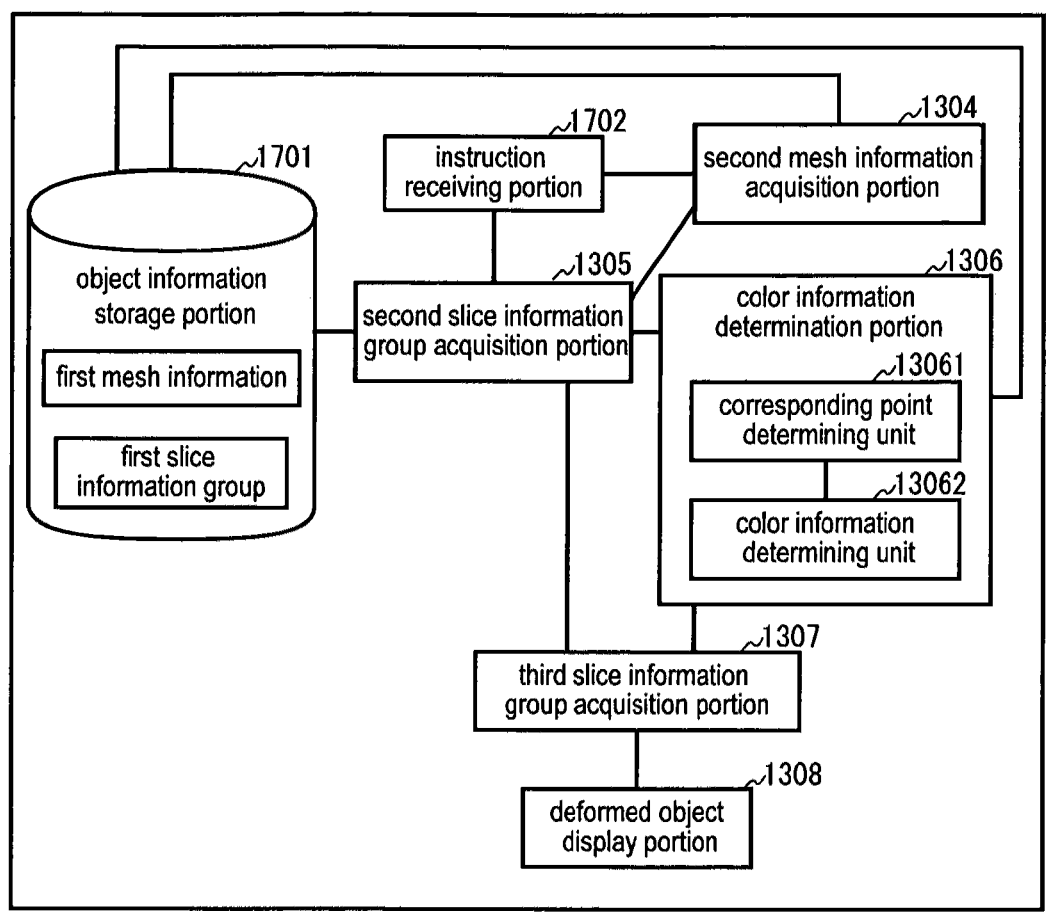
FIG. 17 is a block diagram showing an information processing apparatus according to Embodiment 3.
Figure 18:
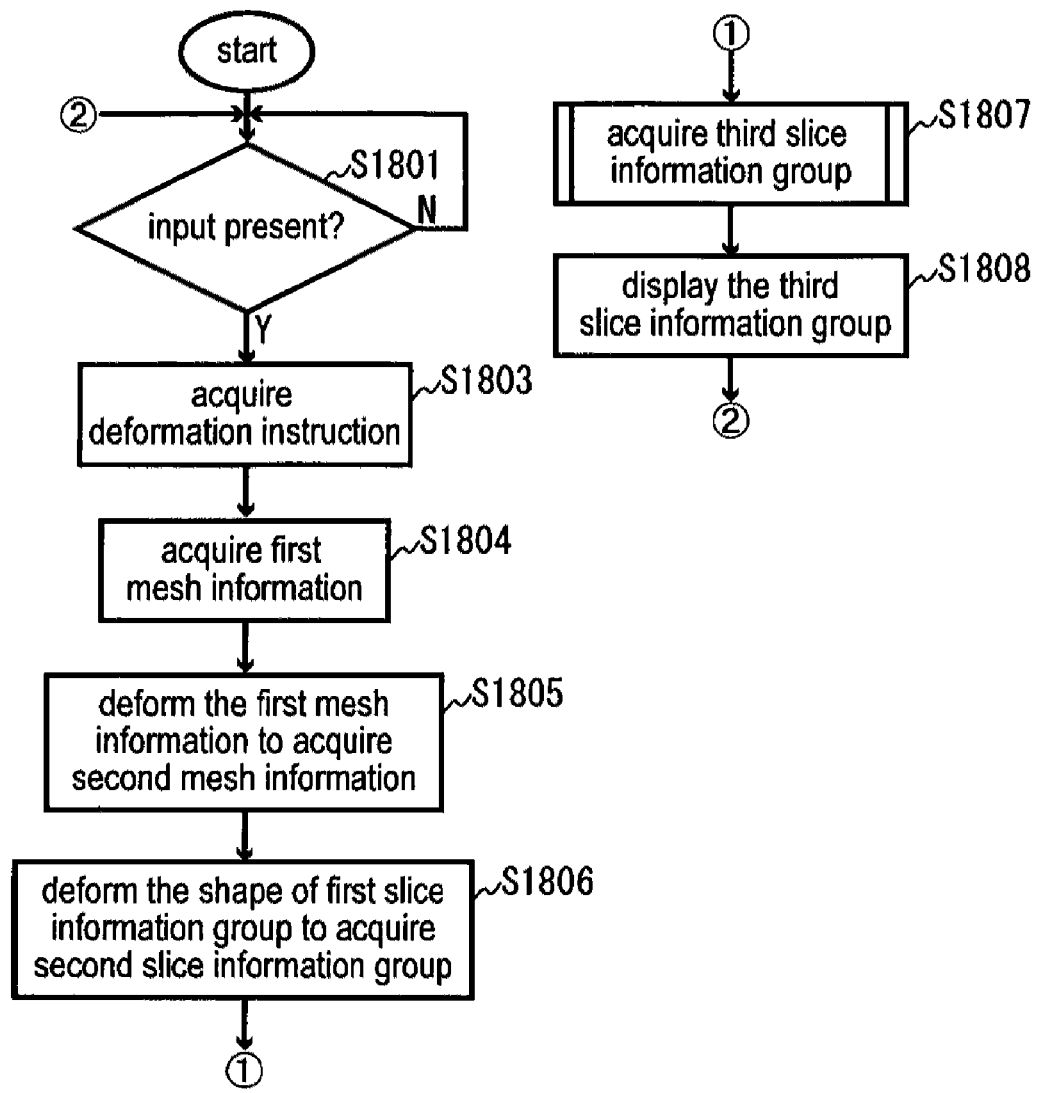
FIG. 18 is a flowchart illustrating the operation of the same information processing apparatus.

The invention claimed is:

1. A tangible non-transitory information processing apparatus comprising:
 a mesh information acquisition portion configured to deform a first mesh of a three-dimensional object into a deformed mesh of the three-dimensional object, points in the first mesh being translated into points in the deformed mesh;
 a deformed slice information group acquisition portion configured to use said deformed mesh to acquire deformed planes, said deformed mesh being a tetrahedral mesh model;
 a color information determination portion configured to determine new color information for each of the deformed planes;
 a new slice information group acquisition portion configured to associate each of the deformed planes with said new color information, said new color information associated with said deformed planes being a new slice information group,
 wherein said new slice information group is displayable on a deformed object output portion,
 wherein said color information determination portion comprises:
  a corresponding point determining unit determines points in the 3D voxel information that respectively correspond to the points of the plurality of slice information constituting a first slice information group, and
  a color information determining unit acquires the color information of the points in the 3D voxel information that were determined by the corresponding point determining unit.

2. The information processing apparatus according to claim 1, wherein said predetermined spacing between said each of the deformed planes is constant.

3. The information processing apparatus according to claim 1, further comprising:
 an instruction receiving portion configured to receive a deformation instruction, said deformation instruction commanding said mesh information acquisition portion to translate said points in the first mesh into said points in the deformed mesh.

4. The information processing apparatus according to claim 3, wherein said instruction receiving portion is configured to receive a line-of-sight vector, said each of the deformed planes being perpendicular to said line-of-sight vector.

5. The information processing apparatus according to claim 1, wherein each of the deformed planes is a slice from the deformed mesh, volume texture color information associated with said deformed planes being said new color information.

6. The information processing apparatus according to claim 5, wherein said volume texture color information is absent from said deformed mesh.

7. The information processing apparatus according to claim 5, wherein said first mesh is stored in a tangible non-transitory recording medium along with 3D voxel information, said 3D voxel information having said volume texture color information.

8. The information processing apparatus according to claim 7, wherein points in the 3D voxel information associate with said points in the first mesh.

9. The information processing apparatus according to claim 5, further comprising:
 a volume texture slice information group acquisition portion configured to acquire volume texture planes, each of the volume texture planes being a slice from a volume texture of the three-dimensional object,
 wherein said volume texture planes include said volume texture color information.

10. The information processing apparatus according to claim 1, wherein each of the deformed planes is a slice from said first slice information group, said deformed planes associated with color information for the first slice information group being said new color information.

11. The information processing apparatus according to claim 10, wherein said first slice information group is stored in a tangible non-transitory recording medium along with said first mesh.

12. An information processing method comprising the steps of:
 deforming a first mesh of a three-dimensional object into a deformed mesh of the three-dimensional object, said deformed mesh being a tetrahedral mesh model that is used to acquire deformed planes;
 associating each of the deformed planes with new color information, said new color information associated with said deformed planes being a new slice information group,
 wherein said new slice information group is displayable on a deformed object output portion,
 wherein said color information determination portion comprises:
  a corresponding point determining unit determines points in the 3D voxel information that respectively correspond to the points of the plurality of slice information constituting a first slice information group, and
  a color information determining unit acquires the color information of the points in the 3D voxel information that were determined by the corresponding point determining unit.

13. The information processing method according to claim 12, wherein the step of deforming includes translating points in the first mesh into points in the deformed mesh.

14. The information processing method according to claim 12, further comprising:
 receiving a deformation instruction to perform the step of deforming.

15. The information processing method according to claim 12, further comprising:
 receiving a line-of-sight vector, said each of the deformed planes being perpendicular to said line-of-sight vector.

16. The information processing method according to claim 12, wherein said predetermined spacing between said each of the deformed planes is constant.

17. The information processing method according to claim 12, wherein each of the deformed planes is a slice from the deformed mesh, said deformed planes associated with volume texture color information being said new color information.

18. The information processing method according to claim 17, wherein said volume texture color information is absent from said deformed mesh.

19. The information processing method according to claim 17, wherein 3D voxel information includes said volume texture color information, said 3D voxel information being stored along with said first mesh.

20. The information processing method according to claim 19, wherein points in the 3D voxel information associate with said points in the first mesh.

21. The information processing method according to claim 17, wherein volume texture planes include said volume texture color information, each of the volume texture planes being a slice from a volume texture of the three-dimensional object.

22. The information processing method according to claim 12, wherein each of the deformed planes is a slice from said first slice information group, color information for said first slice information group associated with said deformed planes being said new color information.

23. The information processing method according to claim 12, wherein said first slice information group is stored along with said first mesh.

24. A computer program embodied in a tangible non-transitory recording medium, the computer program being configured to perform the method of claim 12,
wherein said recording medium is a volatile recording medium or a nonvolatile recording medium.

* * * * *